(12) United States Patent  (10) Patent No.: US 8,224,273 B2
Ido et al.  (45) Date of Patent: Jul. 17, 2012

(54) DEMODULATOR, DIVERSITY RECEIVER, AND DEMODULATION METHOD

(75) Inventors: Jun Ido, Tokyo (JP); Mitsuru Takeuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 546 days.

(21) Appl. No.: 12/555,372

(22) Filed: Sep. 8, 2009

(65) Prior Publication Data

US 2010/0013553 A1  Jan. 21, 2010

(51) Int. Cl.
  *H04B 17/02* (2006.01)
  *H04K 3/00* (2006.01)

(52) U.S. Cl. ........................................ 455/137; 455/273

(58) Field of Classification Search .................. 455/132, 455/137–138, 272, 273; 375/347
  See application file for complete search history.

(56) References Cited

U.S. PATENT DOCUMENTS

| 3,783,385 | A * | 1/1974 | Dunn et al. | 375/329 |
|---|---|---|---|---|
| 6,512,738 | B1 | 1/2003 | Namekata et al. | |
| 7,369,622 | B2 | 5/2008 | Ueno et al. | |
| 2004/0091057 | A1 | 5/2004 | Yoshida | |
| 2004/0229581 | A1 | 11/2004 | Mizoguchi et al. | |
| 2006/0166634 | A1 | 7/2006 | Ido | |

FOREIGN PATENT DOCUMENTS

| JP | 11-205208 A | 7/1999 |
|---|---|---|
| JP | 2002-064464 A | 2/2002 |
| JP | 2002-111771 A | 4/2002 |
| JP | 2002-300131 A | 10/2002 |
| JP | 2003-051768 A | 2/2003 |
| JP | 2003-060605 A | 2/2003 |
| JP | 2003-229830 A | 8/2003 |
| JP | 2004-112155 A | 4/2004 |
| JP | 2004-135120 A | 4/2004 |
| JP | 2004-208254 A | 7/2004 |
| JP | 2004-312333 A | 11/2004 |
| WO | WO-2004/038956 A1 | 5/2004 |

OTHER PUBLICATIONS

Itami, M. et al., The Journal of the Institute of Image Information and Television Engineers, 53:11:1566-1574 (1999).

* cited by examiner

*Primary Examiner* — Lee Nguyen

(74) *Attorney, Agent, or Firm* — Birch, Stewart, Kolasch & Birch, LLP

(57) ABSTRACT

A diversity receiver includes: a plurality of demodulating means for demodulating inputted OFDM signals, to output their demodulated signals; noise component calculating means provided for each demodulating means, for calculating noise components included in the demodulated signals outputted from corresponding demodulating means; channel profile calculating means provided for each demodulating means, for calculating channel profiles based upon the demodulated signals outputted from corresponding demodulating means; transmission channel decision means for determining transmission channel based upon the channel profiles; reliability information generating means for generating reliability information indicating reliability of the demodulated signals outputted from each demodulating means, based upon the noise components and the results of the determinations by the transmission channel decision means; a weighting factor calculating means for calculating, depending on the reliability information, weighting factors used in combining the demodulated signals outputted from each demodulating means; and a combining means for combining, depending on the weighting factors, the demodulated signals outputted from each demodulating means.

21 Claims, 22 Drawing Sheets

FIG.15
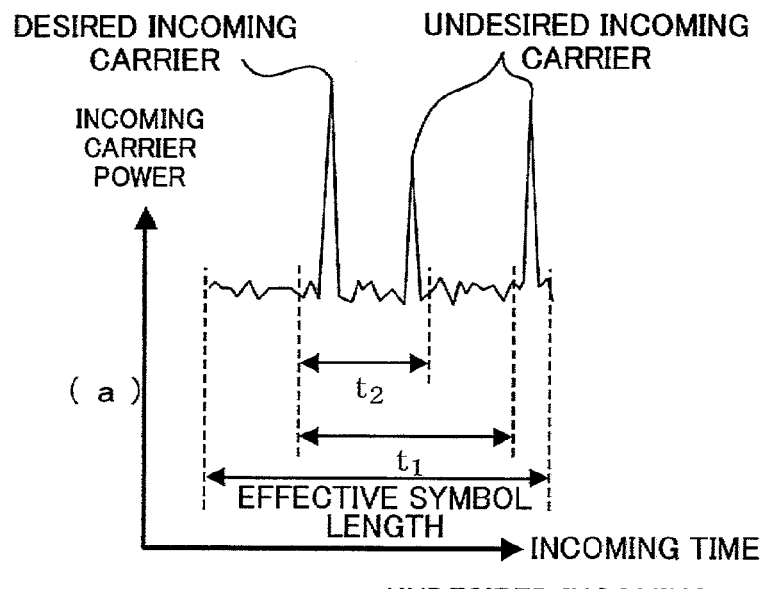
(a)
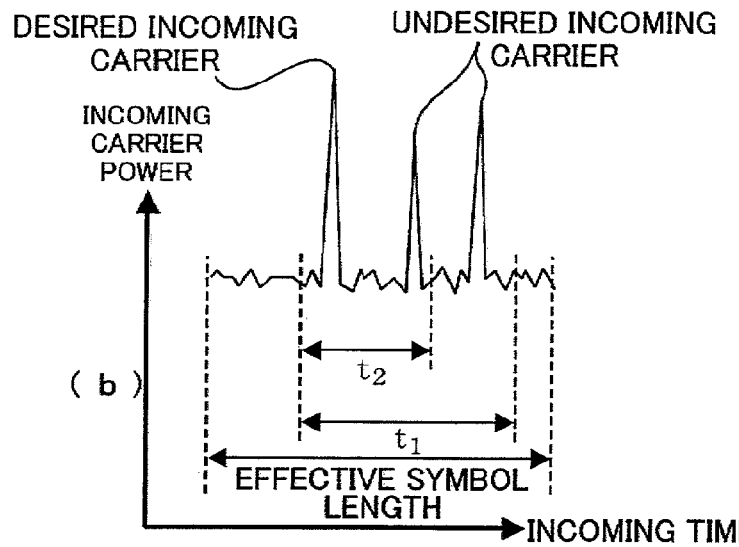
(b)
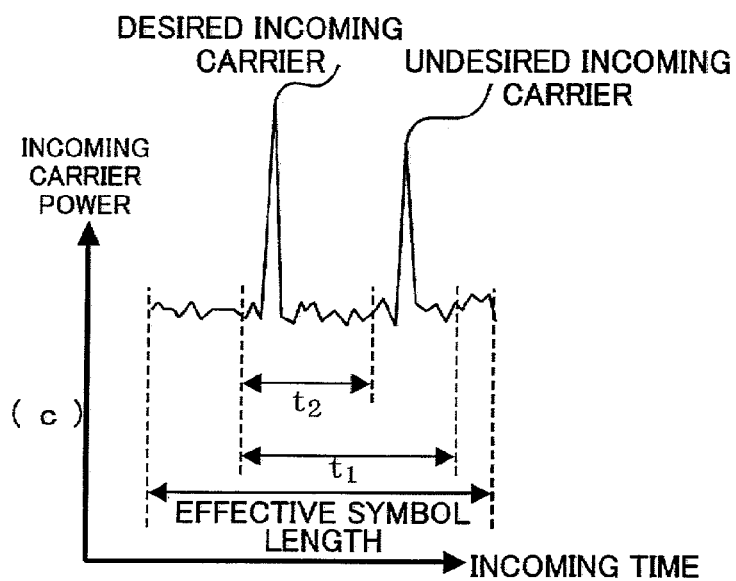
(c)

DEMODULATOR, DIVERSITY RECEIVER, AND DEMODULATION METHOD

TECHNICAL FIELD

The present invention relates to such diversity receivers as perform diversity reception of orthogonal frequency division multiplexing signals.

BACKGROUND ART

A conventional diversity receiver that receives orthogonal frequency division multiplexing (hereinafter referred to as OFDM) signals weights frequency spectrum signals obtained by frequency-converting a plurality of signals received using a plurality of antennas, depending on each carrier's transmission channel response determined from the frequency spectrum signals. Then, the receiver demodulates the frequency spectrum signals by combining the weighted signals carrier by carrier. (Refer to, for example, Patent Document 1 and Non-Patent document 1.)

Patent Document 1: Japanese Patent Laid-Open No. 11-205208 (pp. 8-9, FIG. 1).

Non-Patent Document 1: Makoto Itami, et al., "Reception Characteristics of OFDM Signals using Array Antennas", Journal of The Institute of Information and Television Engineers, vol. 53, No. 11, 1999, pp. 1566-1574.

DISCLOSURE OF INVENTION

In the conventional diversity receiver described above, combining ratios to combine demodulated signals are determined by using the amplitudes or the amplitude squared values of transmission channel responses of each carrier. Therefore, if the average received power or carrier power to noise power ratio of each received signal differs from each other, optimal combining ratios cannot be calculated. Consequently, sufficient diversity gain has not been able to be achieved.

Moreover, if the average received power of each received carrier or the carrier power to noise power ratio greatly differs from each other, the diversity combining brings an increase in error rate of the demodulated signals. Namely, reception performance of the diversity receiver has been degraded.

Furthermore, the amount of distortion of transmission channel through which each received signal has passed, an influence of inter-symbol interference due to the characteristics of transmission channel, or an influence of inter-symbol interference due to incorrect timing of Fourier transform in the diversity receiver cannot be taken into account. Consequently, it has been impossible to calculate optimal combining ratios depending on the influences described above.

The present invention is made to resolve above described problems, and an object of the invention is to improve reception performance of the diversity receiver by combining diversity signals using optimal combining ratios calculated depending on the received signals.

A diversity receiver according to the present invention includes a plurality of demodulating means for demodulating inputted OFDM signals and for outputting the demodulated signals; noise component calculating means provided for each of the demodulating means, for calculating noise components included in the demodulated signals outputted from corresponding demodulating means; channel profile calculating means provided for each of the demodulating means, for calculating channel profiles based upon the demodulated signals outputted from corresponding demodulating means; transmission channel decision means for determining transmission channels based upon the channel profiles; reliability information generating means for generating reliability information indicating reliability of the demodulated signals outputted from each of the demodulating means, based upon the noise components and the results of the determinations by the transmission channel decision means; a weighting factor calculating means for calculating, depending on the reliability information, weighting factors used in combining the demodulated signals outputted from each of the demodulating means; and a combining means for combining, depending on the weighting factors, the demodulated signals outputted from each of the demodulating means.

According to the diversity receiver of the present invention, the diversity combining can be achieved by calculating optimal combining ratios depending on the received signals. Consequently, reception performance of the diversity receiver can be improved.

BRIEF DESCRIPTION OF THE DRAWINGS

FIG. 15 is a schematic view schematically illustrating channel profile outputted from channel profile calculation unit of each branch;

Figure 1:
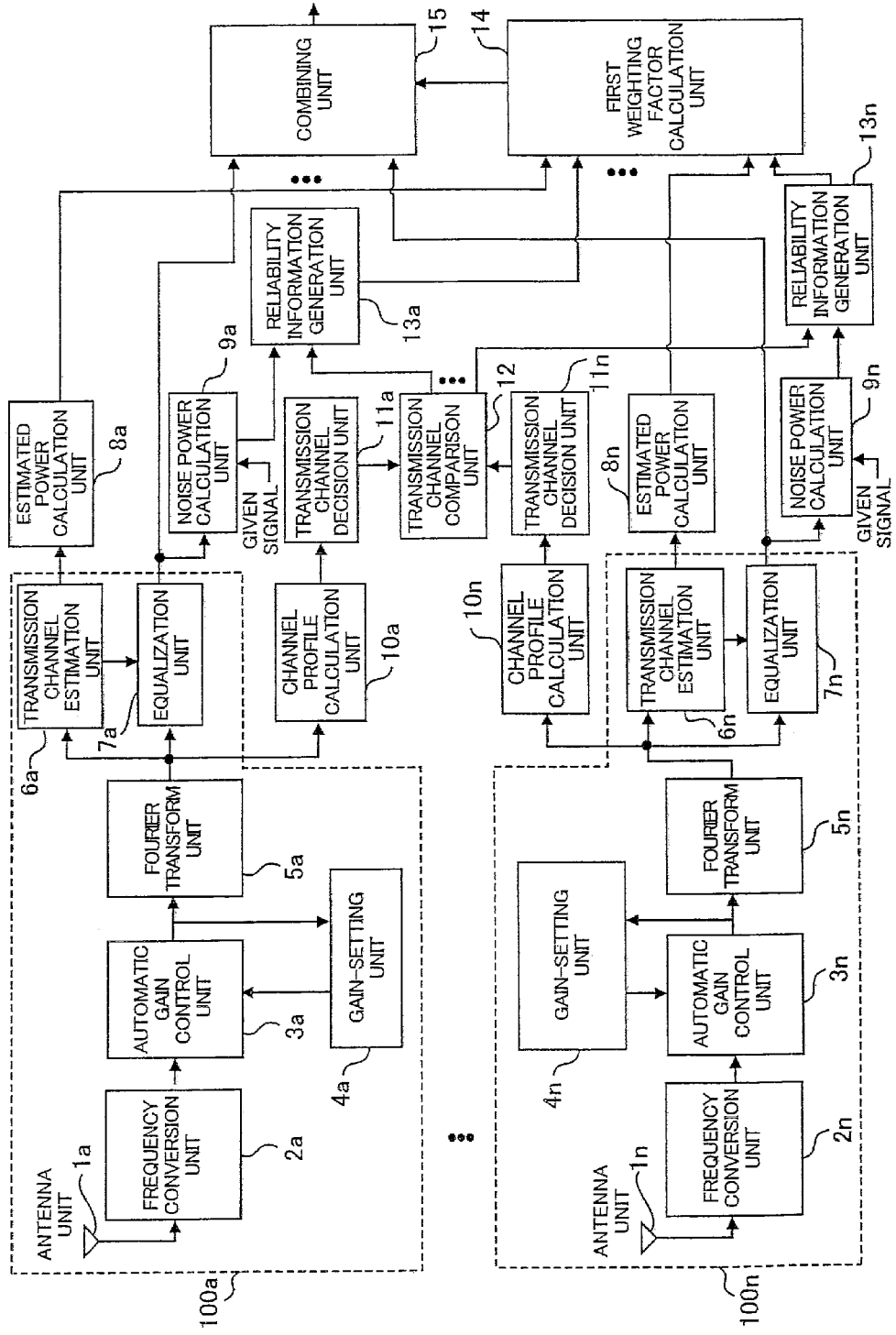
FIG. 1 is a block diagram illustrating a configuration of a diversity receiver according to Embodiment 1 of the present invention.

REFERENCE NUMERALS 1a, 1n: antenna unit,
2a, 2n: frequency conversion unit,
3a, 3n: automatic gain control unit,
4a, 4n: gain-setting unit,
5a, 5n: Fourier transform unit,
6a, 6n: transmission channel estimation unit,
7a, 7n: equalization unit,
8a, 8n: estimated power calculation unit,
9a, 9n, 9a': noise power calculation unit,
10a, 10n: channel profile calculation unit,
11a, 11n, 11a': transmission channel decision unit,
12: transmission channel comparison unit,
13a, 13n, 17a, 17n, 18a, 18n, 19a, 19n: reliability information generation unit,
14, 145a, 145b: first weighting factor calculation unit,
15: combining unit,
16: comparison unit,
20: second weighting factor calculation unit,
91a, 101a: pilot signal extraction unit,
92a: signal error calculation unit,
93a: average error calculation unit,
94a: binarily-modulated signal extraction unit,
95a: hard-decision unit,
96a: difference-value calculation unit,
97a: difference-value average unit,
100a, 100n: demodulation unit,
102a: transmission channel response calculation unit,
103a: transmission channel response interpolation unit,
104a: inverse Fourier transform unit,
105a: incoming-carrier-power calculation unit,
111a, 112a, 116a, 117a: power summation unit,
113a: power ratio calculation unit,
114a: inter-symbol interference decision unit,
115a: transmission channel distortion level decision unit,
141a, 141b, 141c: division unit,
142, 144, 148, 202, 204: weighting factor adjustment unit,
143a, 143b, 147: multiplication unit,
201, 203: mask decision unit.

BEST MODE FOR CARRYING OUT THE INVENTION

Embodiment 1

Prior to explanations on a diversity receiver in Embodiment 1, hereinafter, explanations will be made on transmission techniques of orthogonal frequency division multiplexing and diversity techniques.

First, the transmission technique used in orthogonal frequency division multiplexing will be explained below. Orthogonal frequency division multiplexing is a transmission and reception technique: in the transmitter, data to be transmitted (hereinafter referred to as transmission data) is modulated onto a plurality of carriers whose frequencies are arranged to be orthogonal to each other, and then multiplexed to be sent out; and in the receiver, the transmitted date are processed to be demodulated in a reverse way of the transmitter, which has been developed for practical use particularly in the fields of broadcast as well as telecommunication.

The transmission data to be transmitted in the OFDM transmission are allocated to a plurality of carriers and are modulated digitally onto each carrier by QPSK (quadrature phase shift keying), QAM (quadrature amplitude modulation), DQPSK (differential encoded quadrature phase shift keying), or the like.

Moreover, information on the modulation scheme of the carriers and on the error correction code (hereinafter referred to as transmission parameter), which is required to recover the transmitted data in the receiver, may be sometimes modulated digitally by DBPSK (differential encoded binary phase shift keying) or BPSK (binary phase shift keying) using specific carriers, to be multiplexed.

Furthermore, in order to demodulate each carrier in the receiver, given signals (hereinafter referred to as pilot signals) modulated digitally by DBPSK or BPSK are multiplexed using specific carriers. Furthermore, in order to support the demodulation operation in the receiver, the pilot signals modulated digitally by DBPSK or BPSK may be sometimes multiplexed using specific carriers. The multiplexed carriers described above, after having been orthogonal-transformed by an inverse Fourier transform in the transmitter, are frequency-converted into a desired transmit frequency to be sent out.

To be more specific, the transmission data to be transmitted at the time of transmission is mapped according to the modulation scheme of the carrier, and the mapped data is discrete-inverse-Fourier-transformed. Then, the last part of the data obtained by the discrete inverse Fourier transform is copied to the head of the data. In addition, the copied part is referred to as a guard interval. The addition of the guard interval allows the receiver to recover transmitted signals without causing inter-symbol interference even if the receiver receives a delayed signal that has a delay time shorter than the guard interval length.

In OFDM, all the carriers are orthogonal to each other, so that the receiver can accurately recover the transmitted data if the carrier frequencies are precisely reproduced. Therefore, the receiver that receives an OFDM complex digital signal orthogonally demodulates it, and converts its frequency to a desired frequency band. After removing the guard intervals, the receiver transforms it into signals in frequency-domain by a Fourier transform, then detects and demodulates them.

Since each OFDM carrier transmits transmission data that is mapped according to modulation scheme such as multi-value PSK or Multi-value QAM, given pilot signals are periodically interleaved frequency-wise and time-wise in the carriers, in order to demodulate the carriers. In the terrestrial digital TV broadcast scheme in Japan, for instance, since scattered pilot signals are interleaved periodically in the carriers, the receiver that receives the OFDM signal estimates the characteristics of transmission channel based on the scattered pilot signals so as to demodulate the carriers.

Next, the diversity technique will be explained. The diversity technique is one that improves reception performance of a receiver by providing a plurality (at least two) of demodulation units that demodulate received signals, compared to the case with one demodulation unit. Generally, use of the diversity technique is extremely effective in receiving signals under poor transmission conditions such as multi-path transmission or Rayleigh fading transmission. Specifically, in the case of receiving signals under such poor transmission condition as described above, the error rate of demodulated signals obtained after the receiving signals having been demodulated, can be reduced by carrying out space diversity, that is, reception performance of the receiver can be improved.

FIG. 1 is a block diagram illustrating a configuration of a diversity receiver according to Embodiment 1. The diversity receiver in Embodiment 1 is provided with a plurality (the number n) of demodulation units $100a, \ldots, 100n$. The demodulation units are provided with estimated power calculation units $8a, \ldots, 8n$, noise power calculation units $9a, \ldots, 9n$, channel profile calculation units $10a, \ldots, 10n$, transmission channel decision units $11a, \ldots, 11n$, and reliability information generation units $13a, \ldots, 13n$, respectively.

In the following explanation, referred to as demodulation branches or branches are configurations that include the demodulation units $100a, \ldots, 100n$, and the estimated power calculation units $8a, \ldots, 8n$, the noise power calculation units $9a, \ldots, 9n$, the channel profile calculation units $10a, \ldots, 10n$, the transmission channel decision units $11a, \ldots, 11n$, and the reliability information generation units $13a, \ldots, 13n$ provided for demodulation units $100a, \ldots, 100n$, respectively. Accordingly, the configuration including, for example, the first demodulation unit $100a$, the first estimated power calculation unit $8a$, the first noise power calculation unit $9a$, the first channel profile calculation unit $10a$, the first transmission channel decision unit $11a$, and the first reliability information generation units $13a$ in FIG. 1, is a first branch. FIG. 1 shows two of the branches: the first branch and the n-th branch, out of the first branch through the n-th branch. Since the number n of the demodulation branches perform the same operation independently of each other, configurations common to all the branches will be explained only on the configuration of the first branch as below.

Referring to FIG. 1, an antenna $1a$ of the first branch receives an OFDM signal sent out from a transmitter that is not shown. The OFDM signal received by the antenna $1a$ is inputted into a frequency conversion unit $2a$. The frequency conversion unit $2a$ converts the inputted OFDM signal to that in a predetermined frequency band, and output it to an automatic gain control unit $3a$. The automatic gain control unit $3a$ adds a given gain to the OFDM signal outputted from the frequency conversion unit $2a$, to adjust the power value of the OFDM signal to a predetermined power value, and then outputs the adjusted signal to a gain-setting unit $4a$ and a Fourier transform unit $5a$.

The gain-setting unit $4a$ outputs to the automatic gain control unit $3a$ a signal that sets a gain of the automatic gain control unit $3a$ depending on the output therefrom (hereinafter referred to as gain setting signal). Meanwhile, the Fourier transform unit $5a$ detects the guard intervals added to the OFDM signal at the transmitter so as to establish synchronization, and then Fourier-transforms the inputted OFDM signal. Signals obtained by Fourier-transforming at the Fourier transform unit $5a$ (hereinafter referred to as carrier signals) are outputted to a transmission channel estimation unit $6a$, an equalization unit $7a$, and the channel profile estimation unit $10a$.

The transmission channel estimation unit $6a$ extracts from the carrier signals outputted from the Fourier transform unit $5a$ the pilot signals that have been interleaved at the transmitter, and calculates transmission channel responses based upon the extracted pilot signals and given signals that are given to the diversity receiver and correspond to the pilot signals. To be more specific, the estimation unit calculates the amplitude differences (that is, amplitude fluctuation of the pilot signals caused by the influence of a transmission channel distortion (hereinafter referred to as transmission channel distortion)) between the extracted pilot signals and the given signals, and the phase differences (that is, phase fluctuation of the pilot signals caused by the influence of the transmission channel distortion) between the extracted pilot signals and the given signals. Note that the transmission channel is a channel through which the OFDM signal, received by the antenna $1a$, reaches the diversity receiver from the transmitter.

Moreover, the transmission channel estimation unit $6a$ estimates the transmission channel responses of all the carriers included in the OFDM signal by frequency-wise and time-wise interpolating the transmission channel responses estimated for each pilot signal, and outputs to the equalization unit $7a$ and the estimated power calculation unit $8a$ signals corresponding to the estimated transmission channel responses.

The equalization unit $7a$ equalizes each carrier by dividing the carrier signals outputted from the Fourier transform unit $5a$ by the signals outputted from the transmission channel estimation unit $6a$, and outputs the signals having been equalized (hereinafter referred to as demodulated signals) to the noise power calculation units $9a$ and a combining unit $15$.

Here, the operation of the equalization unit $7a$ is specifically explained. In the first branch, out of the outputs from the Fourier transform unit $5a$ for the i-th OFDM symbols, the carrier that is the k-th frequency component is denoted as $x_{a(i,k)}$, the transmission channel response, $h_{a(i,k)}$, the noise component corresponding to the carrier, $n_{a(i,k)}$, and the carrier sent out from the transmitter, $c_{(i,k)}$. If the frequency of the carrier sent out from the transmitter synchronizes with that of the carrier in the diversity receiver and the timing of the Fourier transform at the Fourier transform unit $5a$ is in phase, a relationship of the following formula (1) is held among $x_{a(i,k)}$, $h_{a(i,k)}$, $n_{a(i,k)}$, and $c_{(i,k)}$.

$$x_{a(i,k)} = h_{a(i,k)} c_{(i,k)} + n_{a(i,k)} \quad (1)$$

Moreover, denoting as $h_{<est>a(i,k)}$ the transmission channel response estimated by the transmission channel estimation unit $6a$ and as $y_{a(i,k)}$, the demodulated signal outputted from the equalization unit $7a$, with respect to the k-th carrier $x_{a(i,k)}$ of the i-th OFDM symbol in the first branch, a relationship of the following formula (2) is held among $x_{a(i,k)}$, $h_{<est>a(i,k)}$, and $y_{a(i,k)}$.

$$y_{a(i,k)} = \frac{x_{a(i,k)}}{h_{<est>a(i,k)}} = \frac{h_{a(i,k)}}{h_{<est>a(i,k)}} c_{(i,k)} + \frac{n_{a(i,k)}}{h_{<est>a(i,k)}} \quad (2)$$

Accordingly, in an ideal case, for example, where the estimated results of the transmission channel in the transmission channel estimation unit $6a$ are correct and there are no noise components throughout the transmission channel, demodulated signals outputted from the equalization unit $7a$ coincide with the carriers sent out from the transmitter. That is, the signals sent out from the transmitter are exactly demodulated.

The estimated power calculation unit $8a$, based upon the signals outputted from the transmission channel estimation unit $6a$, calculates amplitude squared values of the signals (hereinafter referred to as estimated value information) corresponding to the estimated results of the transmission channel responses of each carrier (hereinafter referred to estimated value), and outputs to a first weighting factor calculation unit 14 signals corresponding to the estimated value information. Note that, in the estimated power calculation unit 8a of Embodiment 1, while the explanation has been made on the case of calculating the amplitude squared values as the estimated value information, absolute values of the amplitudes may be calculated in the estimated power calculation unit 8a.

The noise power calculation unit 9a, based upon the pilot signals included in the demodulated signals outputted from the equalization unit 7a, generates information that indicates a noise component in the demodulated signals (for example, an average power value corresponding to the noise component or a value proportional to the power, and hereinafter referred to as noise component information). To be more specific, the noise power calculation unit calculates, for example, the difference between the given signal power that is predetermined in the diversity receiver and the demodulated signal power, and then outputs to the reliability information generation unit 13a a signal according to the power difference as a signal corresponding to the noise component information. That is, the smaller the noise component, the smaller the value corresponding to the noise component information (the power difference), and vice versa.

The channel profile estimation unit 10a, based upon the carrier signals outputted from the Fourier transform unit 5a, calculates a channel profile corresponding to transmission channel through which the OFDM signal received by the antenna 1a has passed. Then, a signal corresponding to the channel profile is outputted to the transmission channel decision unit 11a.

The transmission channel decision unit 11a, based upon the channel profile calculated in the channel profile calculation unit 10a, determines distortion of the transmission channel (transmission channel distortion) through which the OFDM signal has passed, and generates information corresponding to the transmission channel distortion (hereinafter referred to as transmission channel distortion information). Then, a signal corresponding to the transmission channel distortion information is outputted to a transmission channel comparison unit 12.

The transmission channel comparison unit 12 compares power values (i.e., the amounts of transmission channel distortion) corresponding to the transmission channel distortion information generated in the transmission channel decision units 11a, . . . , 11n of the respective branches, and generates information that indicates relative amounts of transmission channel distortion (hereinafter referred to as transmission channel distortion comparison information) corresponding to the demodulated carriers outputted from the respective branches (i.e., the outputs from the equalization units 7a, . . . , 7n). Specifically, the transmission channel distortion comparison information is generated based upon relative relationships of the amounts of transmission channel distortion indicated by the transmission channel distortion information outputted from the transmission channel decision units 11a, . . . , 11n of the respective branches. Then, signals corresponding to the transmission channel distortion information are outputted carrier by carrier to the reliability information generation units 13a, . . . , 13n of the respective branches.

The reliability information generation unit 13a, based upon the signal outputted from the noise power calculation unit 9a and that from the transmission channel comparison unit 12, generates information (hereinafter referred to as reliability information) that indicates reliability of the demodulated signals corresponding to the first branch, and outputs to the first weighting factor calculation unit 14 the reliability information. It is noted that the reliability indicates how close to an ideal transmission channel the transmission channel is through which the OFDM signal, which is received at each demodulation unit of the diversity receiver, has passed before being received. The closer to the ideal transmission channel is the transmission channel in which the OFDM signal propagates, the higher reliability the signal has. Note that the ideal transmission channel is one through which a signal propagates without suffering from the influence of transmission channel distortion nor noise superimposed on the signal.

The first weighting factor calculation unit 14 calculates combining ratios (hereinafter referred to as weighting factors) used in diversity-combining demodulated signals outputted from each branch depending on the signals outputted from the estimated power calculation units 8a, . . . , 8n and those from the reliability information generation units 13a, . . . , 13n of the respective branches, and outputs to the combining unit 15 signals corresponding to the combining ratios.

The combining unit 15 combines the demodulated signals outputted from the equalization units 7a, . . . , 7n in proportion to the respective combining ratios calculated by the first weighting factor calculation unit 14. To be more specific, the demodulated signals are multiplied by the corresponding weighting factors calculated by the first weighting factor calculation unit 14, so that the demodulated signals are combined by summing up the multiplied results. Then, demodulated signals obtained by the combination (hereinafter referred to as output diversity signals) are outputted to devices, etc (not shown) to which the diversity receiver is connected.

Figure 2:
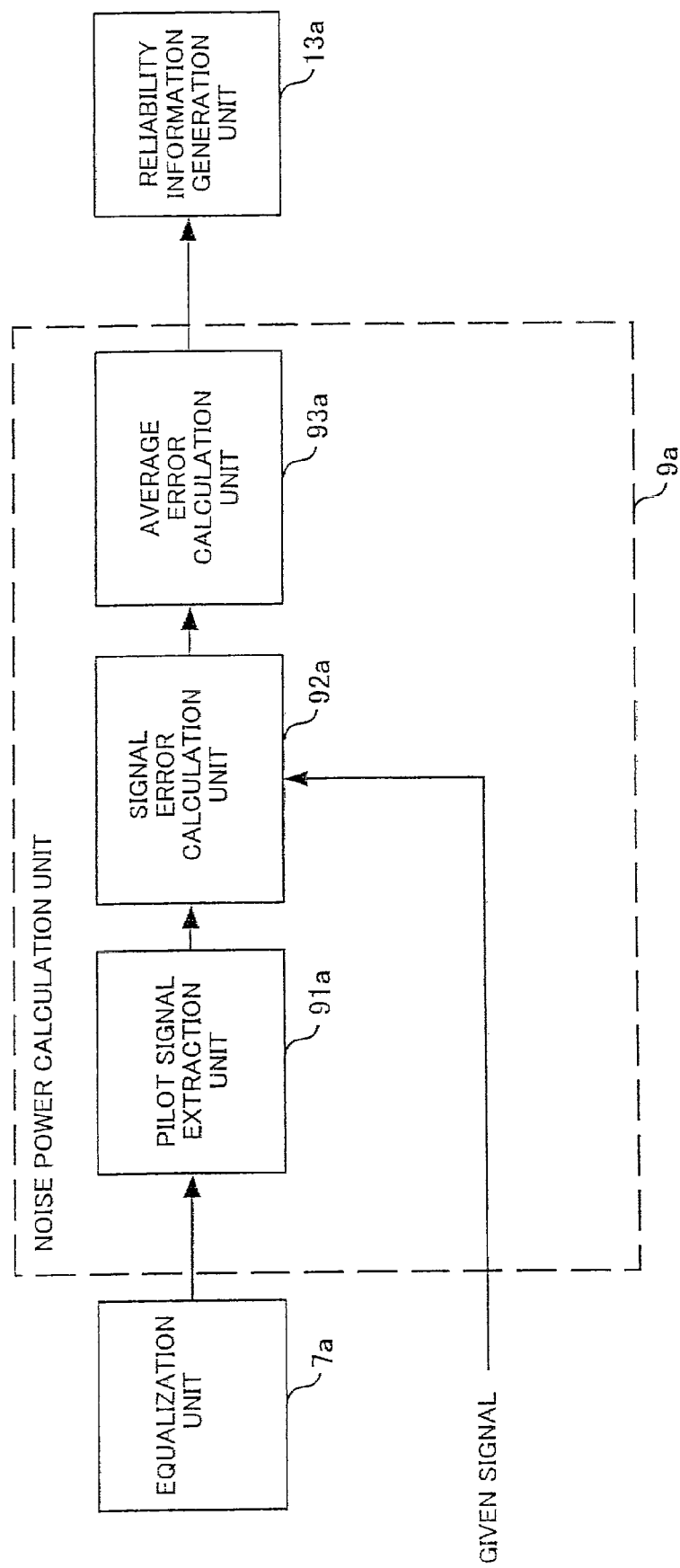
FIG. 2 is a block diagram illustrating a configuration of a noise power calculation unit in Embodiment 1 of the invention.

FIG. 2 is a block diagram illustrating a configuration of the noise power calculation unit 9a. In conventional diversity receivers, as has been described, diversity combining, when the carrier power to noise power ratios of the demodulated signals outputted from each branch (hereinafter referred to as CNR (carrier to noise ratio)) greatly differ from each other, makes the error rate increase. The increase of the error rate is ascribable to incapability of deriving optimal combining ratios because the information on the CNR is not taken into account in the calculation of the combining ratios used in diversity-combining. Hence, in the diversity receiver of Embodiment 1, the noise power calculation unit 9a generates the noise component information in order to derive the optimal combining ratios taking the CNR information into account.

Figure 3:
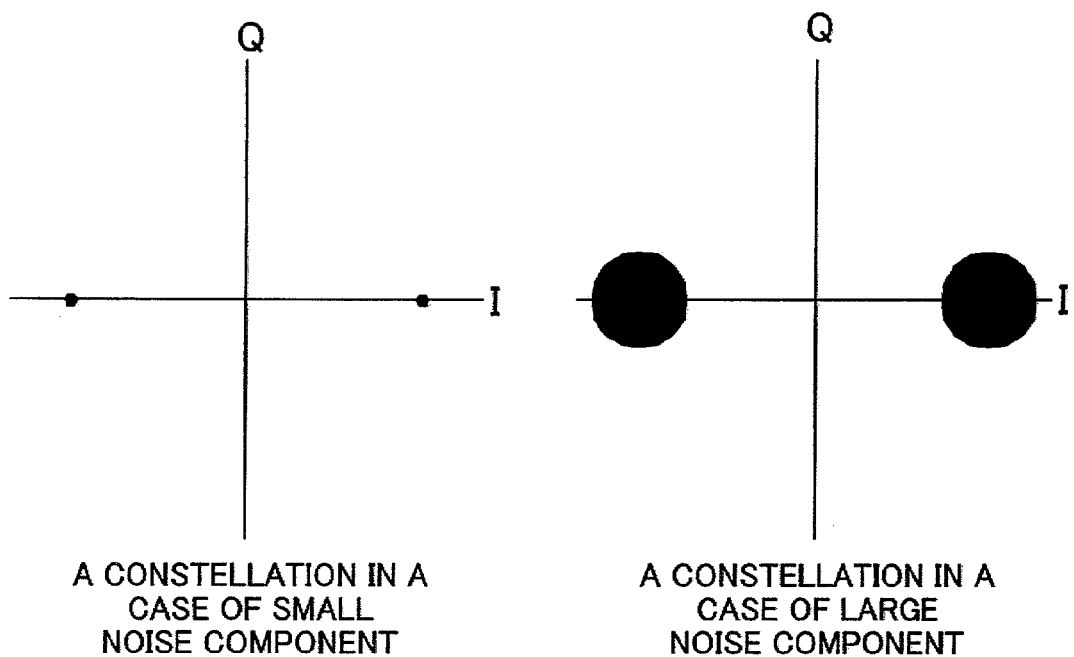
FIG. 3 is explanatory views for explaining a constellation in a case of pilot signals modulated by BPSK or DBPSK, included in an OFDM signal.

Here, an explanation is made on the CNR of the demodulated signal. FIG. 3 is explanatory views for explaining signal point positions on the complex coordinate plane (hereinafter referred to as constellation), of the pilot signals included in the demodulated signals in the case of the pilot signals, which are included in the OFDM signal, modulated by BPSK or DBPSK. FIG. 3A shows a constellation in a case of a large CNR, and FIG. 3B shows that in a case of a small CNR.

The CNR of the demodulated signal obtained in each branch fluctuates under the influence of transmission channel distortion and noise that is superimposed on the OFDM signal throughout the channel (transmission channel), from the transmitter to the diversity receiver, until the demodulated signals having been obtained. Then, the constellation varies in proportion to the CNR fluctuation. That is, if the CNR is larger, a constellation is formed as shown in FIG. 3A, in which the signal points are distributed close to around the original signal positions, and the constellation varies in such a way that the signal points are distributed farther from the original signal positions, with the CNR being smaller. Accordingly, the power of the noise component (hereinafter referred to as noise power) included in the demodulated signals can be calculated from the signal point distribution on the constellation (spread of signal points) of the pilot signals included in the demodulated signals. The signal point distribution equivalently expresses a quantity proportional to the received signal CNR.

Note that a large CNR indicates that noise power is small in comparison with carrier power (i.e., power corresponding to demodulated signal). The noise power also includes power of interference components caused by inter-symbol interference or carrier frequency difference between the transmitter and the receiver, or the like, in addition to power of noise component superimposed on the OFDM signal throughout the transmission channel.

An explanation is made below on the configuration of the noise calculation unit $9a$ shown in FIG. 2. Referring to FIG. 2, a pilot signal extraction unit $91a$ extracts pilot signals included in the demodulated signals outputted from the equalization unit $7a$, and outputs them to a signal error calculation unit $92a$. Note that, in the diversity receiver, the positions of the pilot signals in the demodulated signals are given to the receiver.

The signal error calculation unit $92a$ calculates the differences (power differences) between the power values of the pilot signals outputted from the pilot signal extraction unit $91a$ and those of given signals corresponding to the pilot signals, and outputs to an average error calculation unit $93a$ signals corresponding to the power difference. Note that the given signals in the signal error calculation unit $92a$ are those that are predetermined corresponding to the pilot signals. Here, an explanation is made specifically on the operation in the signal error calculation unit $92a$ with mathematical formulae.

Figure 4:
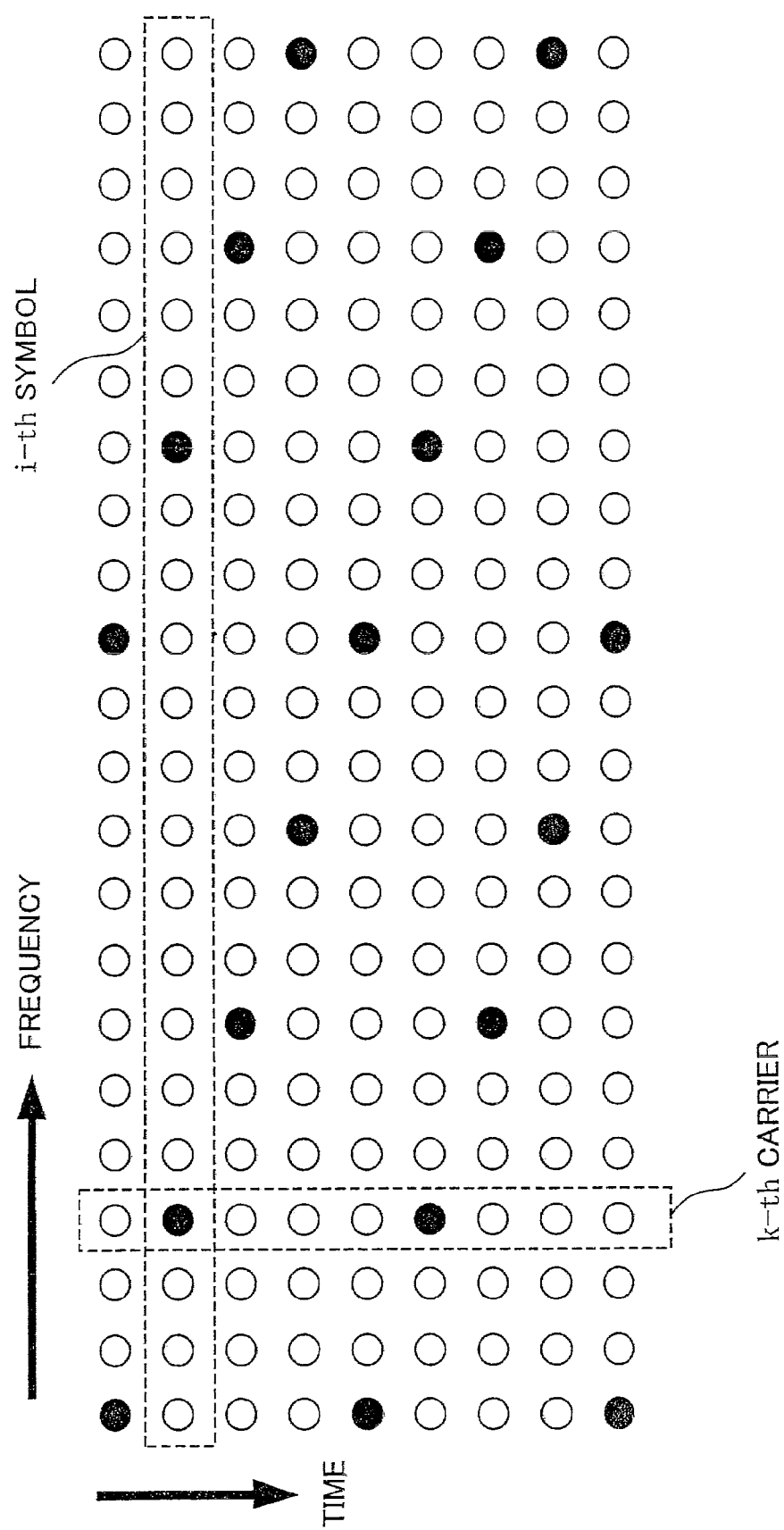
FIG. 4 is a schematic view diagrammatically illustrating an arrangement of a scattered pilot signal and the other signals for use in the OFDM terrestrial digital broadcast system in Japan.

FIG. 4 is a schematic view diagrammatically illustrating an arrangement of pilot signals (scattered pilot signals) and the other signals for use in the terrestrial digital broadcast system in Japan. In FIG. 4, solid circles denote the pilot signals, and open circles, the other signals. As shown in FIG. 4, if an i-th OFDM symbol in a k-th carrier in the OFDM signal received in the first branch is a pilot signal, for example, a signal demodulated from the pilot signal can be expressed as the following formula (3) as a complex signal. The given signal corresponding to the pilot signal is also expressed as the following formula (4). Here, "j" in the formulae (3) and (4) denotes the imaginary unit.

$$y_{a(i,k)}^{pilot} = y_{I,a(i,k)}^{pilot} + jy_{Q,a(i,k)}^{pilot} \quad (3)$$

$$c_{(i,k)}^{pilot} = c_{I,(i,k)}^{pilot} + jc_{Q,(i,k)}^{pilot} \quad (4)$$

Then, the calculation of the signal error calculation unit $92a$ can be expressed as the following formula (5). Note that if the pilot signal is modulated by BPSK or DBPSK to be sent out, the imaginary part of the above formula (4) becomes zero.

$$E_{a(i,k)}^{pilot} = (y_{I,a(i,k)}^{pilot} - c_{I,(i,k)}^{pilot})^2 + (y_{Q,a(i,k)}^{pilot} - c_{Q,(i,k)}^{pilot})^2 \quad (5)$$

The average error calculation unit $93a$ calculates the average of the power differences corresponding to the signals being outputted during a given time period from the signal error calculation unit $92a$. Then a signal corresponding to the average value of the power differences is outputted to the first reliability information generation unit $13a$. Therefore, the power value of the signal outputted from the average error calculation unit $93a$ is proportional to the noise power averaged during the given time period. That is, the larger the noise power (i.e., the smaller the CNR), the larger the power value of the signal outputted from the average error calculation unit $93a$. In addition, the given time period in the average error calculation unit $93a$ is arbitrarily set according to the specification, the design or the like of the diversity receiver.

Figure 5:
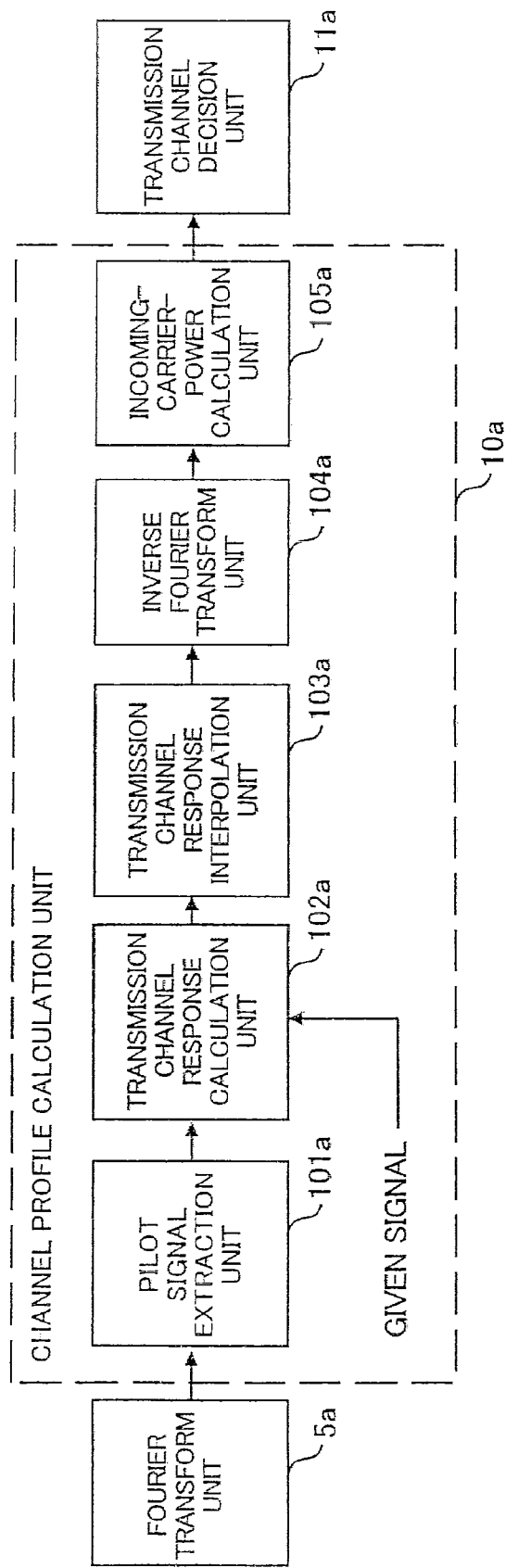
FIG. 5 is a block diagram illustrating a configuration of a channel profile calculation unit in Embodiment 1 of the invention.

FIG. 5 is a block diagram illustrating a configuration of the channel profile calculation unit $10a$. Referring to FIG. 5, a pilot signal extraction unit $101a$ extracts pilot signals from the carrier signals outputted from the Fourier transform unit $5a$, and outputs them to a transmission channel response calculation unit $102a$. Note that the positions of the pilot signals in the carrier have been given to the diversity receiver.

The transmission channel response calculation unit $102a$ calculates transmission channel responses of the pilot signals by dividing the pilot signals outputted from the pilot signal extraction unit $101a$ by given signals corresponding to the pilot signals. Then, signals corresponding to the transmission channel response are outputted to a transmission channel response interpolation unit $103a$. Note that the given signals in the transmission channel response calculation unit $102a$ are those that are predetermined corresponding to the pilot signals.

The transmission channel response interpolation unit $103a$ interpolates frequency-wise and time-wise the transmission channel responses of the pilot signals calculated in the transmission channel response calculation unit $102a$. As shown in FIG. 4, the scattered pilot signals used in the terrestrial digital broadcast in Japan are interleaved frequency-wise and time-wise with regular distribution.

Accordingly, in order to obtain transmission channel responses of all the carrier components except for the scattered pilot signals, it is necessary to interpolate frequency-wise and time-wise the transmission channel responses obtained in the transmission channel response calculation unit $102a$. Hence, as described above, the interpolation is carried out frequency-wise and time-wise in the transmission channel response interpolation unit $103a$. The transmission channel response interpolation unit $103a$ outputs to an inverse Fourier transform unit $104a$ signals that correspond to the transmission channel responses obtained by interpolating frequency-wise and time-wise as described above.

The inverse Fourier transform unit $104a$ inverse-Fourier-transforms the transmission channel responses obtained in the transmission channel response interpolation unit $103a$. Specifically, the transmission channel responses are processed by a discrete inverse Fourier transform. Then, the inverse Fourier transform unit $104a$ outputs to an incoming-carrier-power calculation unit $105a$ a signal (incoming carrier signal) corresponding to the result of the inverse Fourier transform. Note that discrete data used in the discrete inverse Fourier transform process may include not only the full carrier components, but also a part or parts of those. Using the full carrier components can make the channel profile calculation more accurate in the channel profile calculation unit $10a$. On the other hand, using part or parts of those can mitigate the calculation load in the inverse Fourier transform unit $104a$.

The incoming-carrier-power calculation unit $105a$ calculates an amplitude squared value of the signal outputted from the inverse Fourier transform unit $104a$. The signal corresponding to each incoming carrier received by the diversity receiver is obtained by inverse-Fourier-transforming in the inverse Fourier transform unit $104a$. Accordingly, the amplitude squared value of the signal corresponding to each incoming carrier is calculated in the incoming-carrier-power calculation unit $105a$. Then, a signal corresponding to the squared value is outputted as the channel profile to the transmission channel decision unit 11a. In addition, while, in Embodiment 1, the explanation is made on the case where the amplitude squared value is calculated in the incoming-carrier-power calculation unit 105a, an amplitude absolute value may be calculated in the incoming-carrier-power calculation unit 105a.

Figure 6:
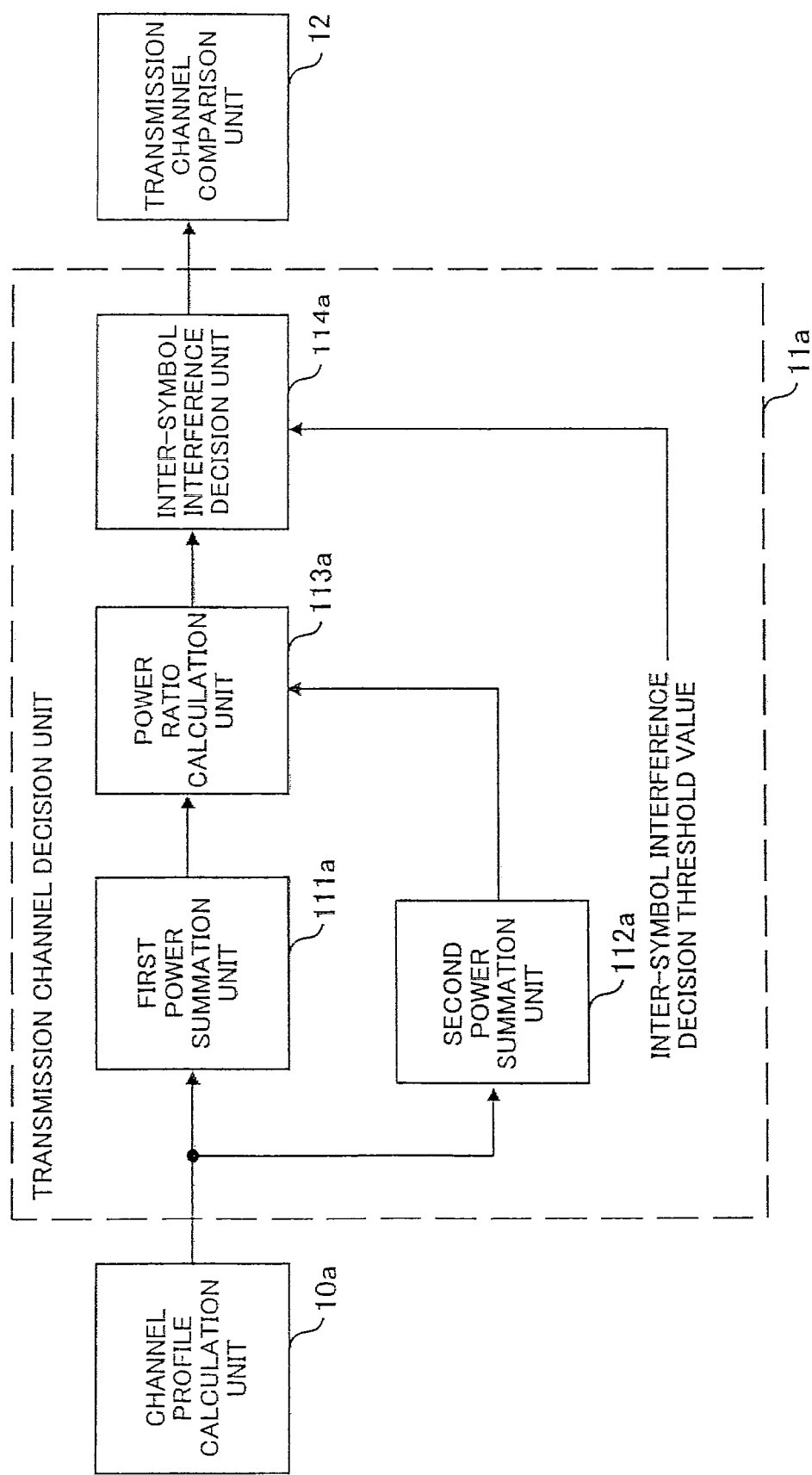
FIG. 6 is a block diagram illustrating a configuration of a transmission channel decision unit in Embodiment 1 of the invention.

FIG. 6 is a block diagram illustrating a configuration of the transmission channel decision unit 11a. As described above, the transmission channel decision unit 11a determines the amount of transmission channel distortion. The amount of transmission channel distortion can be determined based upon the signal outputted from the incoming-carrier-power calculation unit 105a.

Figure 7:
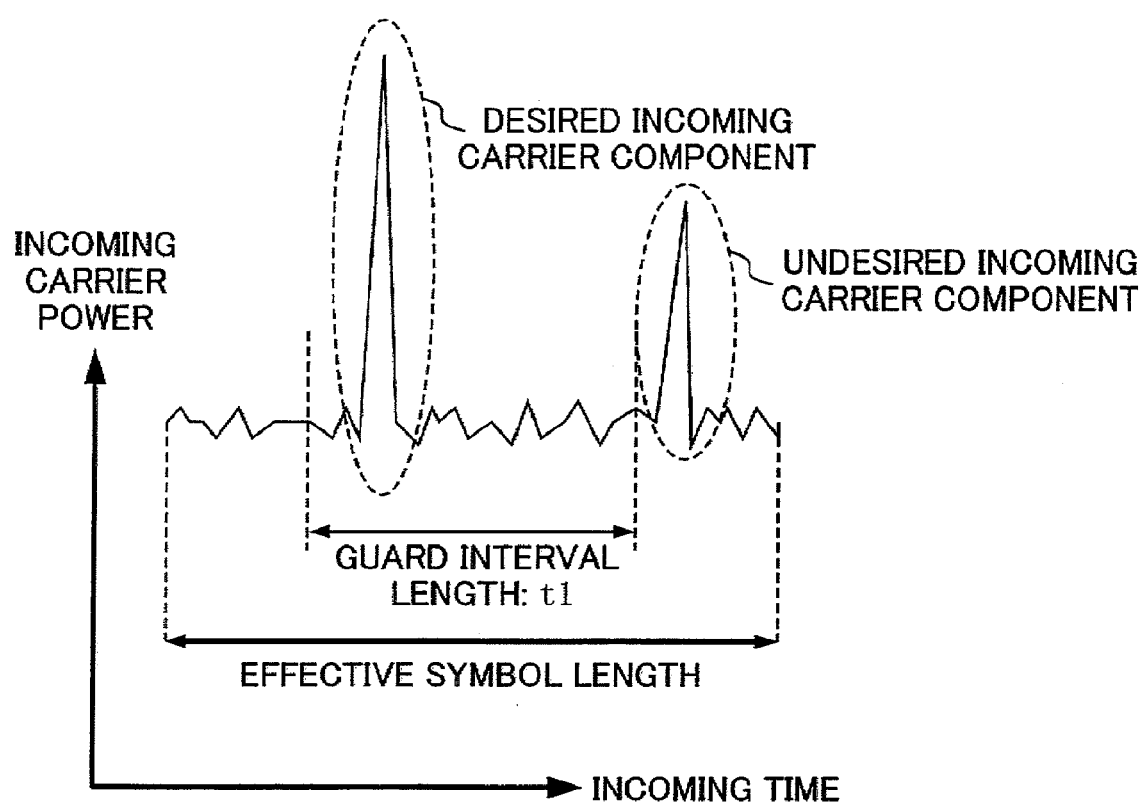
FIG. 7 is a schematic view schematically illustrating a channel profile outputted from an incoming-carrier-power calculation unit.

FIG. 7 is a schematic view schematically illustrating the signal (the channel profile) outputted from the incoming-carrier-power calculation unit 105a. Note that the signal outputted from the incoming-carrier-power calculation unit 105a is illustrated for each incoming carrier in FIG. 7, where the vertical axis indicates incoming-carrier-power values and the horizontal axis, time when each incoming carrier reaches the diversity receiver.

Referring to FIG. 7, defining an incoming carrier having the largest power as a desired carrier (hereinafter referred to as desired incoming carrier) and that having the second largest power as an undesired carrier (hereinafter referred to as undesired incoming carrier), the difference or the ratio in power value between the desired incoming carrier and the undesired incoming carrier can be estimated based upon the output from the incoming-carrier-power calculation unit 105a.

In multiple transmission paths, error rate of demodulated signals generally becomes larger with increasing undesired incoming carrier power in received signal. In particular, if inter-symbol interference occurs, the error rate of the demodulated signals becomes significantly large. That is, reception performance is considerably degraded.

In contrast, in OFDM transmission, inter-symbol interference does not occur as long as the incoming time difference between an incoming carrier and a desired incoming carrier is shorter than the guard interval length. That implies that OFDM transmission has high resistance against multiple transmission paths. If the incoming time difference between an incoming carrier and a desired incoming carrier is longer than the guard interval length, however, inter-symbol interference occurs as the case with the other transmission schemes, which brings reception performance to be degraded considerably. Even if the incoming time difference is shorter than the guard interval length, in cases where numbers of delayed or preceding carriers exist or where the power of delayed or preceding carriers is larger than that of the desired incoming carrier, reception performance of the diversity receiver can also be degraded. Note that the channel profile illustrated in FIG. 7 is one where inter-symbol interference has occurred because the undesired incoming carrier exists outside the guard interval.

As has been described, because conventional diversity receivers are unable to take account of the amount of distortion and the influence of inter-symbol interference concerning the transmission channel through which the received signal has passed, or the influence of the inter-symbol interference caused by incorrect timing of performing a Fourier transform in the diversity receiver, optimal combining ratios cannot be obtained.

Moreover, if the demodulated signals are combined in proportion to the received power of the carriers in such a way as in the conventional diversity receivers, demodulated signals with large deterioration ascribable to the influence of the transmission channel characteristics and those with small deterioration ascribable to the influence of the transmission channel characteristics are likely to be combined disregarding those influences of the transmission channel characteristics. Then, the error rate of the demodulated signals obtained by diversity combining may sometimes increase.

Hence, in the diversity receiver of Embodiment 1, the transmission channel decision unit 11a generates the transmission channel distortion information in order to derive optimal combining ratios by taking information on the amount of transmission channel distortion or the like into account.

The configuration of the transmission channel decision unit 11a shown in FIG. 6 will be explained below. Referring to FIG. 6, a first power summation unit 111a calculates a power sum (hereinafter referred to as power sum) of incoming carriers existing within the guard interval in the channel profile calculated in the channel profile calculation unit 10a. Then, a signal corresponding to the power sum is outputted to a power ratio calculation unit 113a. In the case of the channel profile shown in FIG. 7, for example, the first power summation unit 111a calculates the power sum of each incoming carrier within the range of a guard interval length of t1. In addition, the power sum calculated in the first power summation unit 111a is referred to as the first power sum "$Sum_{p1}$" in the following explanation.

A second power summation unit 112a calculates a power sum of incoming carriers existing outside the guard interval in the channel profile calculated in the channel profile calculation unit 10a. Then, a signal corresponding to the power sum is outputted to the power ratio calculation unit 113a. In cases of the channel profile shown in FIG. 7, for example, the second power summation unit 112a calculates the power sum of each incoming carrier within the effective symbol length but in the range outside the guard interval length t1. In addition, the power sum calculated in the second power summation unit 112a is referred to as the second power sum "$Sum_{p2}$" in the following explanation.

The power ratio calculation unit 113a calculates the ratio (power ratio) of the first power sum to the second one, and outputs to an inter-symbol interference decision unit 114a a signal corresponding to the power ratio.

The inter-symbol interference decision unit 114a determines the presence or absence of inter-symbol interference based upon the power ratio calculated in the power ratio calculation unit 113a, and outputs to the transmission channel comparison unit 12 the determination result as the transmission channel distortion information. To be more specific, the decision unit compares the power ratio with a predetermined threshold value (hereinafter referred to as inter-symbol interference decision threshold value), and determines the presence or absence of the inter-symbol interference depending on the comparison result. When dividing the second power sum by the first power sum ($Sum_{p2}/Sum_{p1}$), for example, since increase of the inter-symbol interference component increases the second power sum, the power ratio value obtained by the division result becomes large. Therefore, the presence or absence of the inter-symbol interference can be determined by comparing the power ratio with the inter-symbol interference decision threshold value. Specifically, if the power ratio is greater than the inter-symbol interference decision threshold value, it is determined that the inter-symbol interference has occurred, and if the power ratio is smaller, it is determined that the inter-symbol interference has not occurred.

Note that while the explanation described above has been made on the case of using the power ratio in determining the presence or absence of the inter-symbol interference, the power difference may be used for the determination. When subtracting the first power sum from the second power sum ($\text{Sum}_{p2}-\text{Sum}_{p1}$), for example, since the increase of the inter-symbol interference component increases the second power sum, the power difference value obtained by the subtraction result becomes large. Therefore, if the power difference is greater than the inter-symbol interference decision threshold value, it is determined that the inter-symbol interference has occurred, and if the power ratio is smaller, it is judged that the inter-symbol interference has not occurred.

Moreover, while, in the explanation described above, the components within the guard interval are regarded as desired incoming carriers and those outside the guard interval, as undesired ones, by taking a component that has the maximum power within an effective symbol and components existing within the range of a predetermined incoming time difference, centering on the largest power component, as a desired incoming carrier, and by taking components existing outside the range as an undesired incoming carrier, the transmission channel distortion information may be generated.

Next, generation of reliability information in the first reliability information generation unit 13a is explained. Here, taking a case with three branches as an example in the following explanation, the three respective branches are defined as the first branch, the second branch, and the third branch. For explanation, the symbol "a" is affixed to each element of the first branch, similarly, the symbol "b", to those of the second one, and the symbol "c", to those of the third one. As described above, the first reliability information generation unit 13a generates the reliability information that indicates reliability of the demodulated signals in each demodulation branch, based upon signals outputted from the noise power calculation unit 9a and the transmission channel comparison unit 12.

For example, if a first signal (signal corresponding to the first transmission channel distortion information) indicating a determination that inter-symbol interference has occurred in the received signal in the first branch is inputted from the first transmission channel decision unit 11a of the first branch, a second signal (signal corresponding to the second transmission channel distortion information) indicating another determination that inter-symbol interference has not occurred in the received signal in the second branches is inputted from the second transmission channel decision unit 11b of the second branch, and a third signal (signal corresponding to the third transmission channel distortion information) indicating another determination that inter-symbol interference has not occurred in the received signal in the third branch is inputted from the third transmission channel decision unit 11c of the third branch, the transmission channel comparison unit 12 generates transmission channel distortion comparison information as expressed by the following formula (6).

$$D_a = d_{isi}$$

$$D_b = D_c = d \quad (6)$$

Here, $d_{isi}$ denotes transmission channel distortion information corresponding to a branch in which inter-symbol interference has occurred, and d denotes that corresponding to a branch in which inter-symbol interference has not occurred. In addition, in the formula (6), $D_a$ denotes the first transmission channel distortion information, $D_b$, the second transmission channel distortion information, and $D_c$, the third transmission channel distortion information. Moreover, $d_{isi}$ and d in the formula (6) are scalars satisfying the following formula (7).

$$d_{isi} \gg d \quad (7)$$

Where d is a sufficiently small scalar compared to $d_{isi}$. Specifically, $d_{isi}$ is set at 100 or 1000 with respect to d=1.

On the other hand, the noise power calculation units 9a, 9b, 9c of the respective branches generate noise component information proportional to the noise power values calculated in the noise power calculation units 9a, 9b, 9c, respectively. In the following explanation, referred to as Na is first noise component information generated in the noise power calculation unit 9a of the first branch, Nb, second noise component information generated in the noise power calculation unit 9b of the second branch, and Nc, third noise component information generated in the noise power calculation unit 9c of the third branch. Note that, as described above, the noise component information generated in the respective noise power calculation units 9a, 9b, 9c becomes small values in a case of small noise components, and becomes large values in a case of large noise components.

When each noise component information and each transmission channel distortion information, which are described above, are inputted to the corresponding reliability information generation units 13a, 13b, 13c of the respective branches, the reliability information generation units 13a, 13b, 13c of the respective branches generate reliability information based upon the inputted noise component information and the transmission channel distortion information. That is, the first reliability generation unit 13a of the first branch generates first reliability information based upon the first transmission channel distortion information $D_a$ and the first noise component information $N_a$. Similarly, the second reliability generation unit 13b of the second branch generates second reliability information based upon the second transmission channel distortion information $D_b$ and the second noise component information $N_b$, and the third reliability generation unit 13c of the third branch generates third reliability information based upon the third transmission channel distortion information $D_c$ and the third noise component information $N_c$. Specifically, each of the reliability information is calculated as shown by the following formulae (8).

$$R_a = D_a N_a = d_{isi} N_a$$

$$R_b = D_b N_b = d N_b$$

$$R_c = D_c N_c = d N_c \quad (8)$$

In the formulae (8), $R_a$ denotes the first reliability information, $R_b$, the second reliability information, $R_c$, the third reliability information. As described above, the smaller the noise component, the smaller the noise component information value. Moreover, the transmission channel distortion information value becomes small when inter-symbol interference does not occur. That is, the smaller is the reliability information value calculated by the formulae (8), the higher is the demodulated signal reliability of the branch corresponding to the reliability information. Therefore, in the example case described above, when the ratio among the first noise component information value $N_a$, the second one $N_b$, and the third one $N_c$, that is, $N_a:N_b:N_c=3:2:1$, and $d_{isi}=1$ and d=100, for example, it becomes that $R_a:R_b:R_c=300:2:1$. That is, the demodulated signal reliability of the first demodulation branch is lowest, and that of the third demodulation branch is highest.

Figure 8:
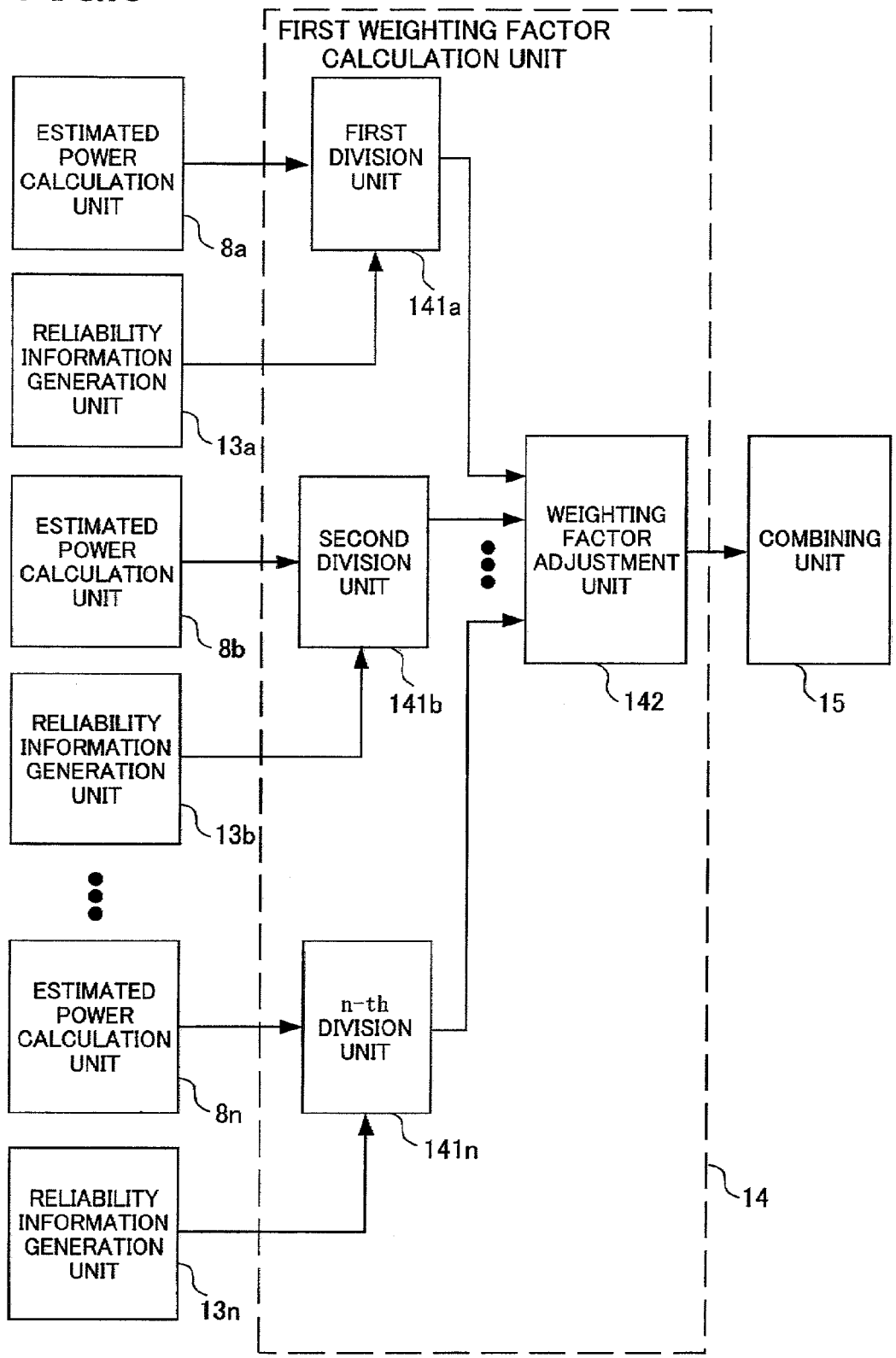
FIG. 8 is a block diagram illustrating a configuration of a weighting factor calculation unit in Embodiment 1 of the invention.

FIG. 8 is a block diagram illustrating a configuration of the first weighting factor calculation unit 14. The first weighting factor calculation unit 14 calculates combining ratios (hereinafter referred to as weighting factors) that are used in combining demodulated diversity signals outputted from each branch, based upon the reliability information outputted from the reliability information generation units 13a, . . . , 13n of the respective branches and the estimated value information outputted from the estimated power calculation units 8a, . . . , 8n of the respective branches. In addition, the weighting factors are calculated such that the sum total of the weighting factors corresponding to demodulated signals is set as one.

If the diversity receiver is provided with, for example, three branches as described above, diversity output signals finally outputted from the diversity receiver can be expressed by the following formula (9).

$$z_{(i,k)} = \frac{1}{\frac{p_{a(i,k)}}{R_a} + \frac{p_{b(i,k)}}{R_b} + \frac{p_{c(i,k)}}{R_c}} \left( \begin{array}{c} \frac{p_{a(i,k)}}{R_a} y_{a(i,k)} + \frac{p_{b(i,k)}}{R_b} y_{b(i,k)} + \\ \frac{p_{c(i,k)}}{R_c} y_{c(i,k)} \end{array} \right) \quad (9)$$

In the formula (9), $R_a$ denotes the first reliability information, $y_{a(i,k)}$, the k-th demodulated signal (a first demodulated signal) of the i-th OFDM symbol outputted from the first branch, $p_{a(i,k)}$, the estimated value information outputted from the estimated power calculation unit 8a of the first branch (hereinafter referred to as first estimated value information). Similarly, $R_b$ denotes the second reliability information, $y_{b(i,k)}$, the k-th demodulated signal (a second demodulated signal) of the i-th OFDM symbol outputted from the second branch, $p_{b(i,k)}$, the estimated value information outputted from the estimated power calculation unit 8b of the second branch (hereinafter referred to as second estimated value information), and $R_c$ denotes the third reliability information, $y_{c(i,k)}$, the k-th demodulated signal (a third demodulated signal) of the i-th OFDM symbol outputted from the third branch, and $p_{c(i,k)}$, the estimated value information outputted from the estimated power calculation unit 8c of the third branch (hereinafter referred to as third estimated value information).

Accordingly, from the formula (9), the weighting factors $W_{a(i,k)}$ corresponding to the first branch can be expressed as the following formula (10).

$$w_{a(i,k)} = \frac{\frac{p_{a(i,k)}}{R_a}}{\frac{p_{a(i,k)}}{R_a} + \frac{p_{b(i,k)}}{R_b} + \frac{p_{c(i,k)}}{R_c}} \quad (10)$$

Similarly, the weighting factors $W_{b(i,k)}$ corresponding to the second branch can also be expressed as the following formula (11), and the weighting factors $W_{c(i,k)}$ corresponding to the third branch, as the following formula (12).

$$w_{b(i,k)} = \frac{\frac{p_{b(i,k)}}{R_b}}{\frac{p_{a(i,k)}}{R_a} + \frac{p_{b(i,k)}}{R_b} + \frac{p_{c(i,k)}}{R_c}} \quad (11)$$

$$w_{c(i,k)} = \frac{\frac{p_{c(i,k)}}{R_c}}{\frac{p_{a(i,k)}}{R_a} + \frac{p_{b(i,k)}}{R_b} + \frac{p_{c(i,k)}}{R_c}} = 1 - (w_{a(i,k)} + w_{b(i,k)}) \quad (12)$$

Namely, the weighting factors for the demodulated signals in each branch can be calculated by dividing values that are obtained by dividing estimated value information of one demodulation branch by reliability information of the one demodulation branch, by a value obtained by summed-up values that are obtained by dividing estimated value information of each branch by the reliability information of the branch. Note that while the explanation described above is made on the case of three branches, weighting factors can be calculated similarly even in the cases of two, four or more branches.

In the following, the configuration of the first weighting factor calculation unit 14 as shown in FIG. 8 will be explained. Referring to FIG. 8, a first division unit 141a outputs to a weighting factor adjustment unit 142 signals corresponding to first quotients obtained by dividing the first estimated value information by the first reliability information. Similarly, a second division unit 141b outputs to the weighting factor adjustment unit 142 signals corresponding to second quotients obtained by dividing the second estimated value information by the second reliability information. Moreover, an n-th division unit 141n outputs to the weighting factor adjustment unit 142 signals corresponding to n-th quotients obtained by dividing the n-th estimated value information by the n-th reliability information.

The weighting factor adjustment unit 142 sums up the first quotients, the second quotients, . . . , and the n-th quotients. Then, first weighting factors corresponding to the first branch are calculated by dividing the first quotients by the summed-up value (hereinafter referred to as summation). Similarly, second weighting factors are calculated by dividing the second quotients by the summation. Moreover, n-th weighting factors are also calculated by dividing the n-th quotients by the summation. Then, signals corresponding to the first weighting factors, the second weighting factors, . . . , the n-th weighting factors are outputted to the combining unit 15

The combining unit 15 combines demodulated signals based upon the weighting factors calculated in the first weighting factor calculation unit 14 and the demodulated signals outputted from each branch. Accordingly, as described above, in the case of three demodulation branches, for example, the demodulated signals are combined based upon the formula (9). To be more specific, the unit combines the demodulated signals by the calculation as shown by the following formula (13), and outputs the diversity output signals $z_{(i,k)}$.

$$z_{(i,k)} = W_{a(i,k)} y_{a(i,k)} + W_{b(i,k)} y_{b(i,k)} + W_{c(i,k)} y_{c(i,k)} \quad (13)$$

As has been explained above, according to the diversity receiver of Embodiment 1, combining ratios used in combining demodulated signals can be calculated taking the influence of the CNR into account. Moreover, the combining ratios used in combining demodulated signals can also be calculated in consideration of the influence of transmission channel distortion and of inter-symbol interference in particular.

Therefore, optimal combining ratios can be calculated taking the influences of the CNR and the transmission channel distortion into account, which prevents error rate from increasing by combining the demodulated signals, and consequently can bring about a sufficient effect of diversity combining. That is, reception performance of the diversity receiver can be improved.

It should be noted that the first weighting factor calculation unit 14 described above can be configured as explained below in a case of two branches.

Figure 9:
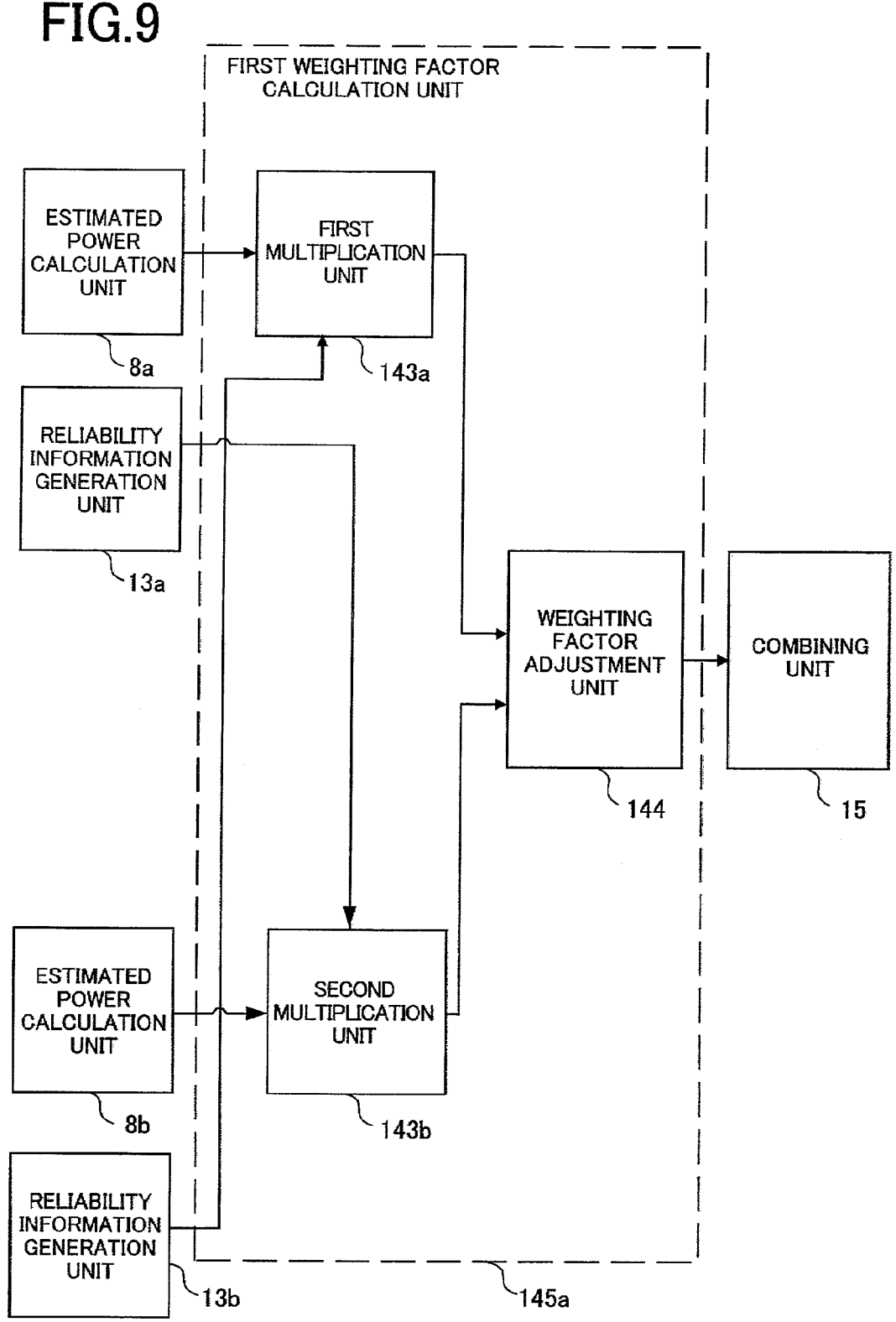
FIG. 9 is a block diagram illustrating a configuration of a weighting factor calculation unit in a case of two demodulation branches.

FIG. 9 is a block diagram illustrating a configuration of a first weighting factor calculation unit 145a in the case of two branches. Referring to FIG. 9, a first multiplication unit 143a outputs to a weighting factor adjustment unit 144 signals corresponding to first products obtained by multiplying the first estimated value information outputted from the first estimated power calculation unit 8*a* by the second reliability information outputted from the reliability generation unit 13*b* of the second branch. Similarly, a second multiplication unit 143*b* outputs to the weighting factor adjustment unit 144 signals corresponding to second products obtained by multiplying the second estimated value information outputted from the second estimated power calculation unit 8*b* by the first reliability information outputted from the reliability generation unit 13*a* of the first branch.

Note that when configuring the first weighting factor calculation unit 145*a* as shown in FIG. 9, the unit is configured such that the second reliability information is outputted from the second reliability information generation unit 13*b* of the second branch, to the first multiplication unit 143*a*, and the first reliability information is outputted from the first reliability information generation unit 13*a* of the first demodulation branch to the second multiplication unit 143*a*.

Then, the weighting factor adjustment unit 144 calculates the first weighting factors by dividing the first products by a value (sum value) obtained by summing-up the first products and the second products. The weighting factor adjustment unit 144 also calculates the second weighting factors by dividing the second products by the sum value. That is, the weighting factor adjustment unit 144 calculates the first weighting factors $w_{a(i,k)}$ and the second weighting factors $w_{b(i,k)}$ by the following formulae (14) and (15), respectively.

$$w_{a(i,k)} = \frac{R_b p_{a(i,k)}}{R_b p_{a(i,k)} + R_a p_{b(i,k)}} \quad (14)$$

$$w_{b(i,k)} = \frac{R_a p_{b(i,k)}}{R_b p_{a(i,k)} + R_a p_{b(i,k)}} = 1 - w_{a(i,k)} \quad (15)$$

When the diversity receiver is provided with two branches, the first weighting factors $w_{a(i,k)}$ or the second weighting factors $w_{b(i,k)}$ is also calculated using the following formulae (16) and (17).

$$w_{a(i,k)} = \frac{p_{a(i,k)}}{p_{a(i,k)} + \frac{R_a}{R_b} p_{b(i,k)}} \quad (16)$$

$$w_{b(i,k)} = 1 - w_{a(i,k)} \quad (17)$$

Figure 10:
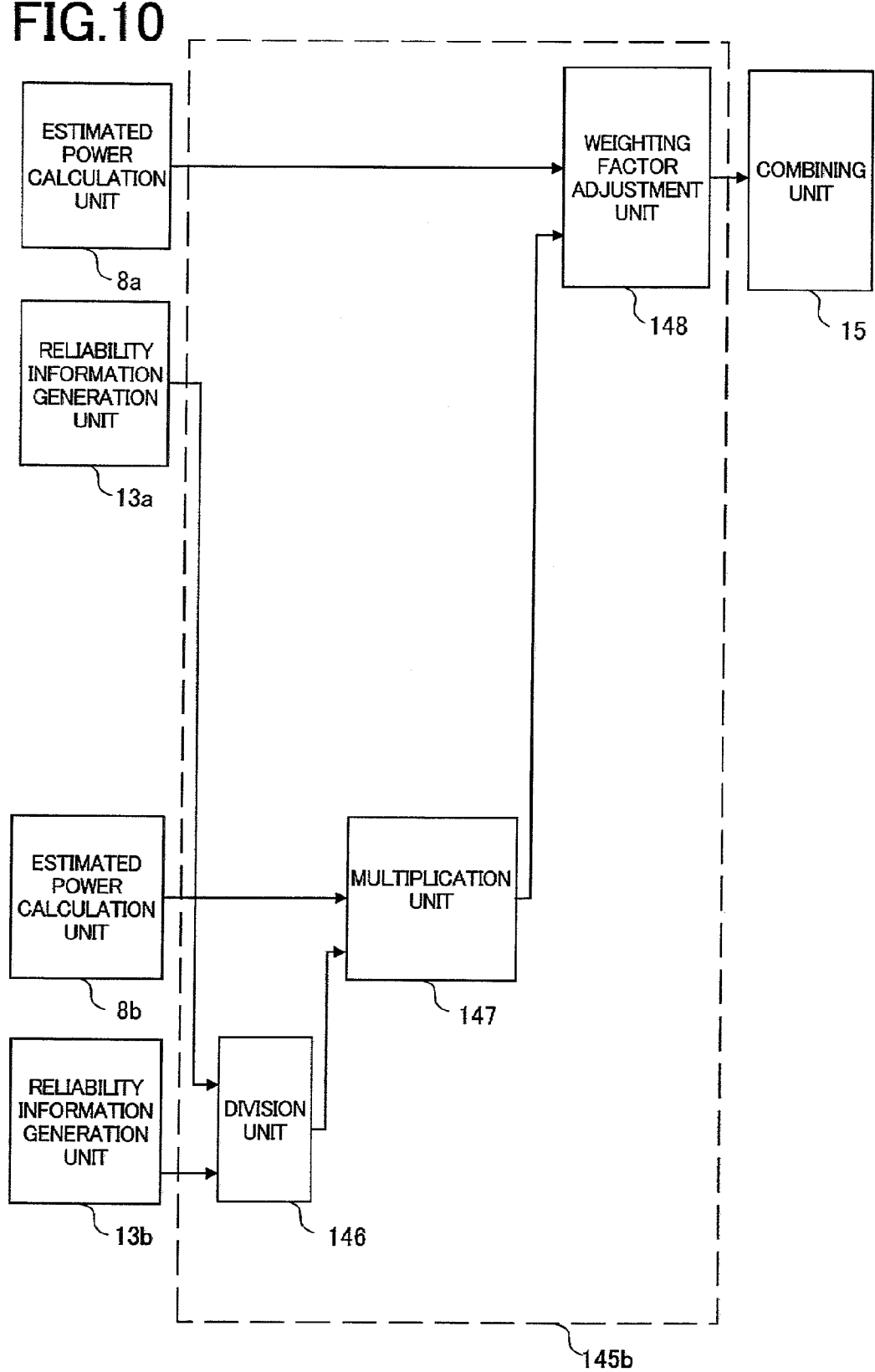
FIG. 10 is a block diagram illustrating another configuration of the weighting factor calculation unit in the case of two demodulation branches.

In the case of calculating the first weighting factors $w_{a(i,k)}$ or the second weighting factors $w_{b(i,k)}$ using the formulae (16) and (17), respectively, the first weighting factor calculation unit can be configured as shown in FIG. 10, for example.

FIG. 10 is a block diagram illustrating another configuration of the weighting factor calculation unit 145*b* in the case of two demodulation branches. Referring to FIG. 10, a division unit 146 outputs to a multiplication unit 147 a signal corresponding to a quotient obtained by dividing the first reliability information outputted from the first reliability information generation unit 13*a* of the first branch by the second reliability information outputted from the reliability information generation unit 13*b* of the second branch.

The multiplication unit 147 outputs to a weighting factor adjustment unit 148 signals corresponding to products obtained by multiplying the second estimated value information outputted from the second estimated power calculation unit 8*b* by the quotient obtained in the division unit 146.

The weighting factor adjustment unit 148 sums-up the products and the first estimated value information outputted from the first estimated power calculation unit 8*a*. Then, the first weighting factors $w_{a(i,k)}$ are calculated by dividing the first estimated value information by the sum value obtained by the result of the summation. Furthermore, the second weighting factors $w_{b(i,k)}$ are calculated by subtracting the first weighting factors $w_{a(i,k)}$ from one.

While the above explanation has been made on the configuration in which the weighting factor adjustment units 142, 144, 148 perform predetermined operations, the weighting factor adjustment units 142, 144, 148 may be configured with a table that relates signals inputted from division units, multiplication units, or the like to weighting factors. In the case explained using FIG. 8, for example, a weighting factor adjustment unit can be configured with a table that relates the first quotients outputted from the first division unit 141*a*, the second quotients outputted from the second division unit 141*b*, through to the n-th quotients outputted from the n-th division unit 141*n* to the first weighting factors $w_{a(i,k)}$, the second weighting factors $w_{b(i,k)}$, through to the n-th weighting factors $w_{n(i,k)}$.

Embodiment 2

Figure 11:
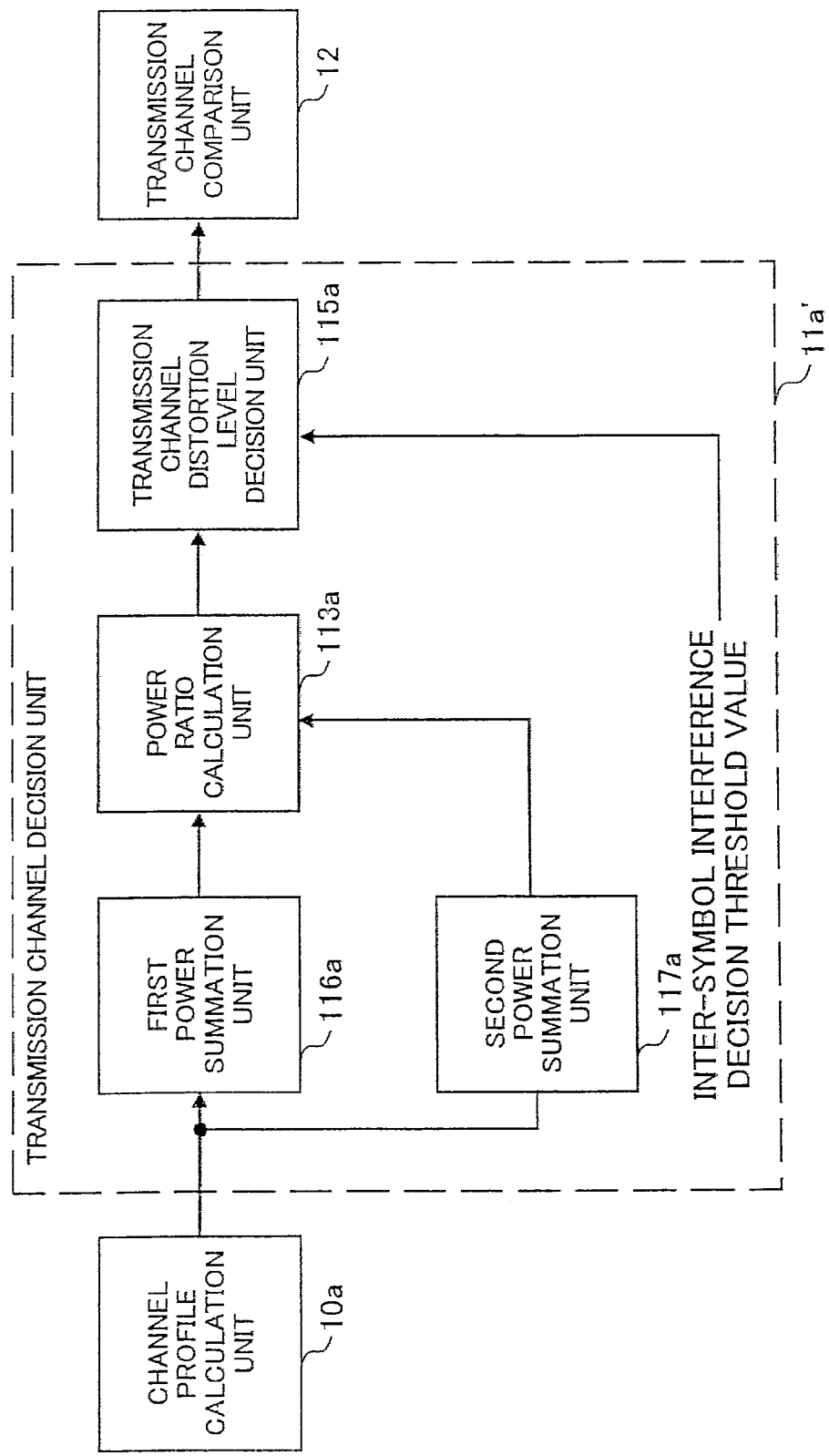
FIG. 11 is a block diagram illustrating a configuration of a transmission channel decision unit in Embodiment 2 of the invention.

FIG. 11 is a block diagram illustrating a configuration of a transmission channel decision unit 11*a'* in Embodiment 2. In the following explanation, the same numerals are assigned to the same configurations as those of the diversity receiver in Embodiment 1, and the explanation on the configurations will be omitted.

Figure 12:
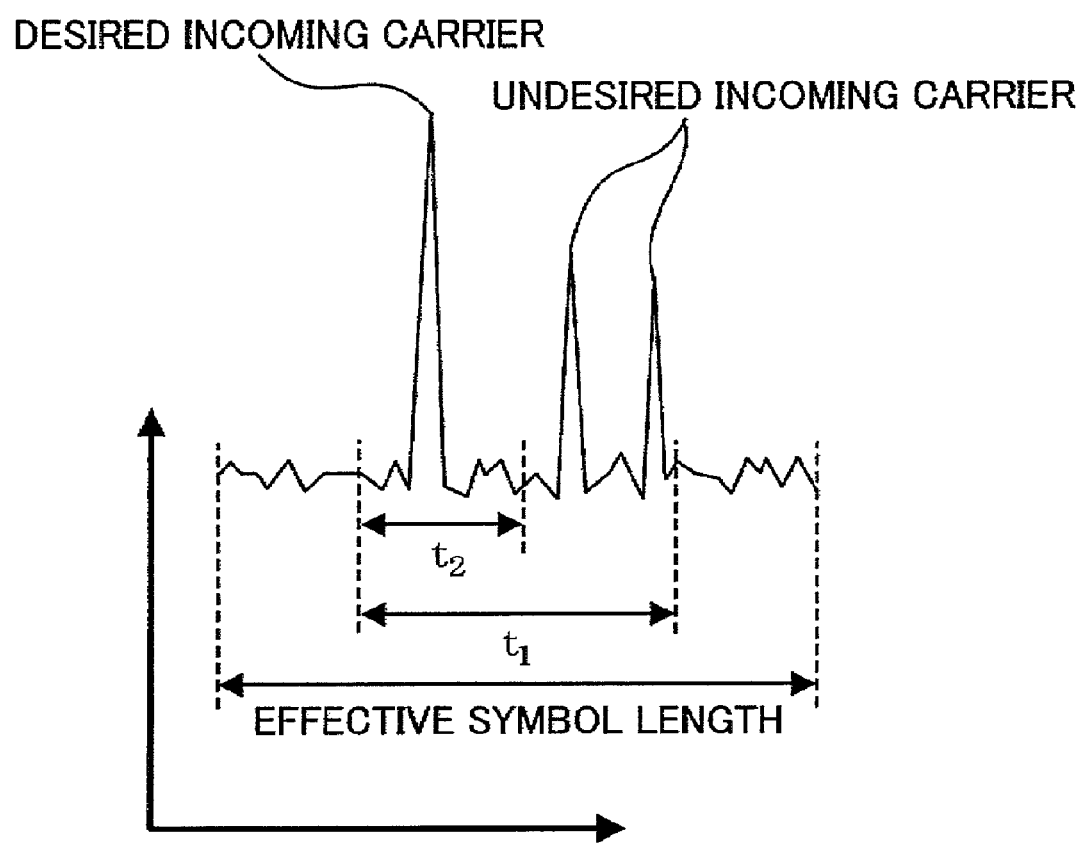
FIG. 12 is a schematic view schematically illustrating a channel profile calculated by the channel profile calculation unit.

Referring to FIG. 11, a power summation unit 116*a* calculates a power sum (a first power sum "$\text{Sum}_{p1}$") of incoming carriers existing within a given time period in the channel profile calculated in the channel profile calculation unit 10*a*, and outputs to the power ratio calculation unit 113*a* a signal corresponding to the first power sum. If a channel profile as shown in FIG. 12, for example, is calculated in the channel profile calculation unit 10*a*, the first power summation unit 116*a* calculates the first power sum by setting $t_2$, which is indicated in FIG. 12, as the given time period. Note that although the given time period can be arbitrarily determined according to the specification, the design or the like of the diversity receiver, it should be determined such that a desired incoming carrier component is included within the period.

On the other hand, a second power summation unit 117*a* calculates a power sum (a second power sum "$\text{Sum}_{p2}$") of incoming carrier components existing outside the given interval in the channel profile calculated in the channel profile calculation unit 10*a*, and outputs to the power ratio calculation unit 113*a* a signal corresponding to the second power sum. In the case of the channel profile shown in FIG. 12, for example, the second power summation unit 117*a* calculates a power sum of incoming carrier components existing within the effective symbol length but outside the given time period $t_2$.

The power ratio calculation unit 113*a* calculates a ratio (power ratio) of the first power sum to the second power sum, and outputs to a transmission channel distortion level decision unit 115*a* a signal corresponding to the power ratio.

A transmission channel distortion level decision unit 115*a* determines the level of the transmission channel distortion based upon the power ratio calculated in the power ratio calculation unit 113*a*, and outputs to the transmission channel comparison unit 12 the result of the determination as transmission channel distortion information. To be more specific, the decision unit compares the power ratio with a predetermined threshold value (hereinafter referred to as transmission channel decision threshold value) to determine the transmission channel distortion level depending on the comparison result. In addition, the transmission channel decision threshold value is determined arbitrarily according to the specification, the design or the like of the diversity receiver.

When the second power sum is divided by the first power sum ($Sum_{p2}/Sum_{p1}$), for example, the second power sum becomes large as the transmission channel distortion becomes large (i.e., undesired incoming carriers increase). Consequently, the value of the power ratio becomes larger with increasing transmission channel distortion.

Hence, the determination of the transmission channel distortion level in the transmission channel distortion level decision unit 115a is performed in such a way that a plurality of transmission channel decision threshold values are determined depending on the amount of transmission channel distortion, to compare the power ratio outputted from the power ratio calculation unit 113a with the plurality of transmission channel decision threshold values. Then, the transmission channel distortion level decision unit 115a outputs to the transmission channel comparison unit 12 a transmission channel decision threshold value that is larger than and closest to the power ratio, as the transmission channel distortion information.

Figure 13:
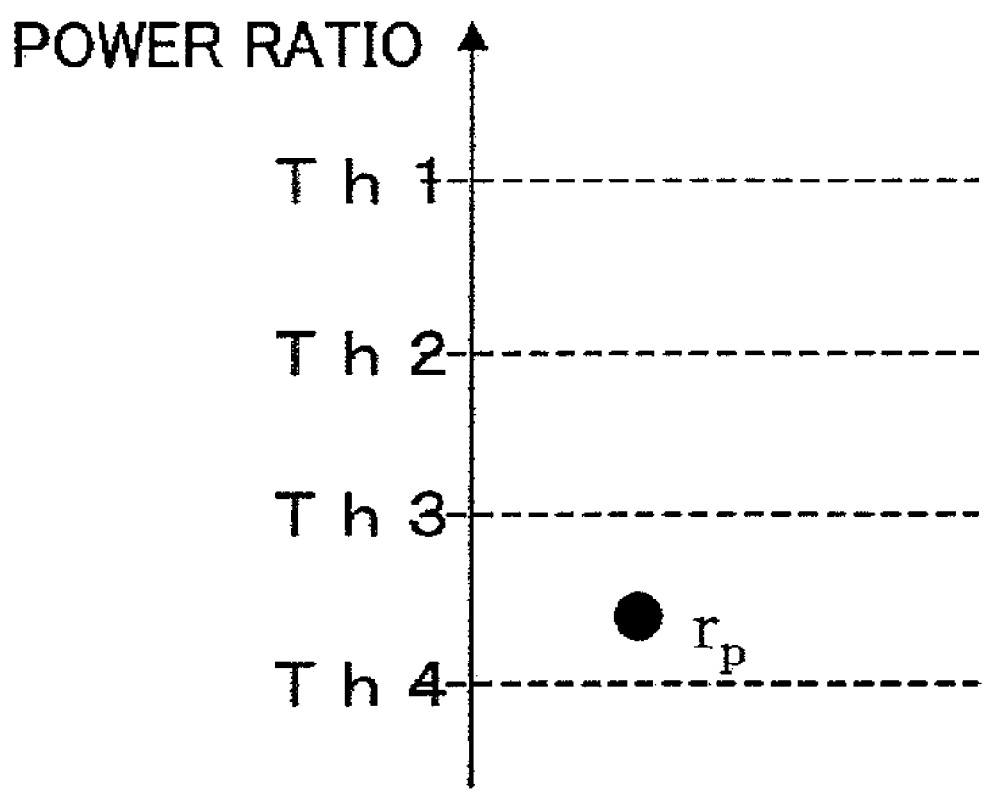
FIG. 13 is an explanatory view for explaining generation of transmission channel distortion information by a transmission channel-distortion level decision unit.

To explain more specifically, in a case of setting, for example, four transmission channel decision threshold values: a first transmission channel decision threshold value Th1, a second transmission channel decision threshold value Th2, a third transmission channel decision threshold value Th3, and a fourth transmission channel decision threshold value Th4, in the transmission channel distortion level decision unit 115a as shown in FIG. 13, if the power ratio outputted from the power ratio calculation unit 113b is $r_p$, the transmission channel distortion level decision unit 115a outputs to the transmission channel comparison unit 12 the third transmission channel decision threshold value Th3 as the transmission channel distortion information.

In addition, while the explanation described above has been made on the case of using the power ratio in determining the transmission channel distortion level, a power difference may be used in the determination. For example, in a case of subtracting the first power sum from the second power sum ($Sum_{p2}-Sum_{p1}$), since the transmission channel distortion becomes large, which makes the value of the second power sum large, the value of the power difference, obtained by the subtraction result, becomes large. Accordingly, when the transmission channel distortion is determined by the power difference, the transmission channel distortion level decision unit 115a may be configured so as to output to the transmission channel comparison unit 12 a transmission channel threshold value that is larger than and closest to the power difference, as the transmission channel distortion information.

Moreover, while, in the explanation described above, the maximum-power incoming carrier within the effective symbol is taken as a desired incoming carrier, and the others, as undesired incoming carriers, transmission channel distortion information may be generated by taking as desired incoming carriers a maximum-power incoming carrier within the effective symbol and carriers included within a range of a predetermined incoming time difference centering on the maximum power incoming carrier, and as undesired carriers, incoming carriers outside the range.

If the transmission channel decision unit 11a' is configured as shown in FIG. 11, the reliability information generation unit generates reliability information as described below. The following explanation will be made on the case of three branches as with Embodiment 1.

When the transmission channel comparison unit 12 has determined that, for example, a transmission channel distortion level corresponding to the first branch is maximum and that corresponding to the third branch is minimum, the comparison unit 12 generates first transmission channel distortion comparison information $D_a$, second transmission channel distortion comparison information $D_b$, and third transmission channel distortion comparison information $D_c$ as indicated by the following formulae (18), and outputs them to the reliability information units 13a, 13b, and 13c of the respective branches, respectively.

$$D_a = d_1$$

$$D_b = d_2$$

$$D_c = d_3 \tag{18}$$

Note that $d_1$, $d_2$, and $d_3$ in the formulae (18) are scalars that satisfy the following formula (19), and the values of $d_1$, $d_2$, and $d_3$ are determined depending on relative amounts of transmission channel distortion information outputted from the transmission channel decision units of the respective branches.

$$d_1 > d_2 > d_3 \tag{19}$$

For example, taking as a reference the third transmission channel distortion comparison information $D_c$ corresponding to the third branch in which the transmission channel distortion is smallest, if the value of the second transmission channel distortion comparison information $D_b$ corresponding to the second branch is two times as much as that of the third transmission channel distortion comparison information $D_c$ and the value of the first transmission channel distortion comparison information $D_a$ corresponding to the first branch is three times as much as that of the third transmission channel distortion comparison information $D_c$, the values of the respective transmission channel distortion comparison information are defined as $d_1 = 3$, $d_2 = 2$, and $d_3 = 1$.

Then, the reliability information generation units 13a, 13b, and 13c of the respective branches generate reliability information based upon the inputted noise component information and transmission channel distortion comparison information. That is, the reliability information generation unit 13a of the first branch (the first reliability information generation unit 13a) generates first reliability information $R_a$ based upon the first transmission channel distortion comparison information $D_a$ and the first noise component information $N_a$. Similarly, the reliability information generation unit 13b of the second branch (the second reliability information generation unit 13b) generates second reliability information $R_b$ based upon the second transmission channel distortion comparison information $D_b$ and the second noise component information $N_b$, and the reliability information generation unit 13c of the third branch (the third reliability information generation unit 13c) generates third reliability information $R_c$ based upon the third transmission channel distortion comparison information $D_c$ and the third noise component information $N_c$. Specifically, each of the reliability information is calculated by the following formulae (20).

$$R_a = D_a N_a = d_1 N_a = 3 N_a$$

$$R_b = D_b N_b = d_2 N_b = 2 N_b$$

$$R_c = D_c N_c = d_3 N_c = N_c \tag{20}$$

As described above, the smaller the noise component, the smaller the value of the noise component information. Similarly, the smaller the transmission channel distortion level, the smaller the value of the transmission channel distortion information. That is, if the value of the reliability information calculated by the formula (20) is small, reliability of demodulated signals in the branch corresponding to the reliability information is high. Therefore, in the example above, if a ratio of the first noise component information value $N_a$, the second noise component information value $N_b$, and the third noise component information value $N_c$ to one another is $N_a:N_b:N_c=3:2:1$, for example, a ratio of the reliability information becomes $R_a:R_b:R_a=9:4:1$. That is, the reliability of the demodulated signals in the first branch is lowest and that in the third is highest.

As explained above, according to the diversity receiver of Embodiment 2, combining ratios used in combining demodulated signals can be calculated taking the influence of the CNR into account. Moreover, the combining ratios used in combining demodulated signals can also be calculated in consideration of the influence of transmission channel distortion and inter-symbol interference levels in particular.

In the case of the channel profile shown in FIG. 12, for example, because no undesired incoming carriers exist outside the guard interval $t_1$, no inter-symbol interference occurs. In contrast, numbers of undesired incoming carriers exist within the guard interval $t_1$. It is generally considered that if there are numbers of undesired incoming carriers even within the guard interval $t_1$, the transmission channel distortion level is high. Accordingly, it is desirable to take the influence of undesired incoming carriers into account when the undesired incoming carriers exist even within the guard interval.

Then, in the transmission channel decision unit $11a'$ in Embodiment 2, by calculating a power sum during a predetermined time period of $t_2$ that is shorter than the guard interval $t_1$, the influence of the undesired incoming carriers within the guard interval $t_1$ can be taken into account. That is, the transmission channel distortion can be detected in more detail.

Therefore, according to the diversity receiver of Embodiment 2, optimal combining ratios can be calculated taking the influence of the CNR and the transmission channel distortion into account, which prevents error rate increase caused by combining the demodulated signals, and consequently can bring about a sufficient effect of diversity combining. That is, reception performance of the diversity receiver can be improved.

In addition, the diversity receiver can also be configured by combining the transmission channel decision unit $11a'$ explained in Embodiment 2 with the transmission channel decision unit $11a$ explained in Embodiment 1.

Figure 14:
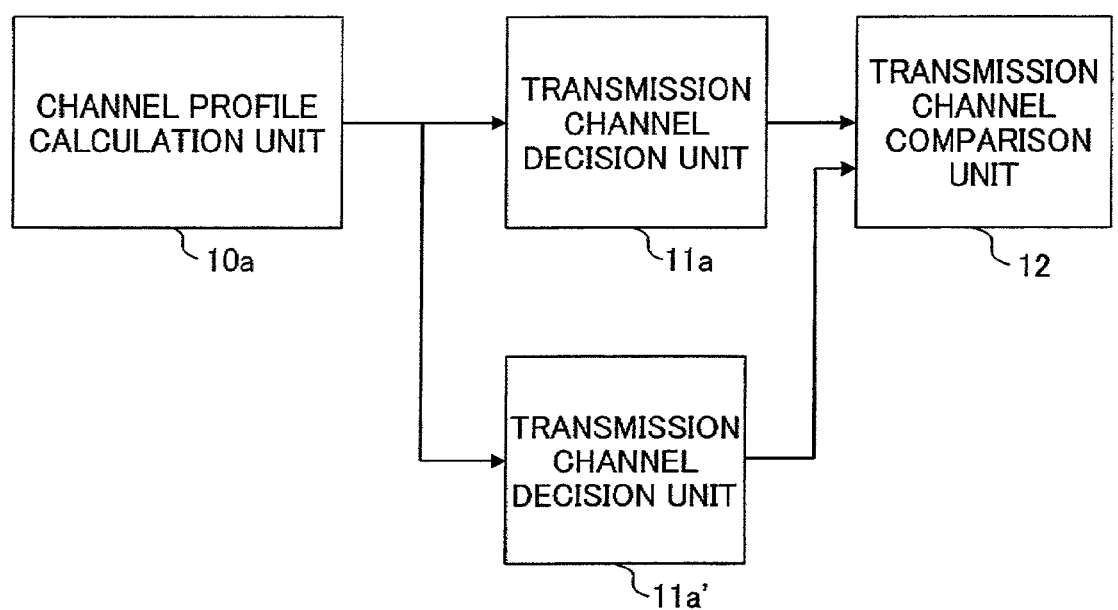
FIG. 14 is a block diagram illustrating a configuration of a diversity receiver in a case of a combination of the transmission channel decision unit in Embodiment 2 and that in Embodiment 1.

FIG. 14 is a block diagram illustrating a configuration in a case of combining the transmission channel decision unit $11a'$ explained in Embodiment 2 with the transmission channel decision unit $11a$ explained in Embodiment 1. In FIG. 14, the same numerals are assigned to the configurations explained in Embodiment 1 and Embodiment 2, and the explanation on the configurations will be omitted. Moreover, in the explanation on FIG. 14, the transmission channel decision unit $11a$ explained in Embodiment 1 is referred to as the first transmission channel decision unit $11a$ and the transmission channel decision unit $11a'$ explained in Embodiment 2 is referred to as the second transmission channel decision unit $11a'$.

In the case of combining the first transmission channel decision unit $11a$ with the second transmission channel decision unit $11a'$ as shown in FIG. 14, the first transmission channel decision units $11a, \ldots, 11n$ and the second transmission channel decision units $11a', \ldots, 11n'$ are connected in parallel between the channel profile units $10a, \ldots, 10n$ of the branches and the transmission channel comparison unit 12, respectively. Accordingly, the first transmission channel decision unit $11a$ and the second transmission channel decision unit $11a'$, for example, are connected in parallel between the channel profile unit $10a$ of the first branch and the transmission channel comparison unit 12. Then, if a diversity receiver is configured as shown in FIG. 14, the transmission channel comparison unit 12 generates transmission channel distortion comparison information in the following way. A case will be explained below where the diversity receiver is provided with three branches.

An explanation is made, for example, on a case where a channel profile shown in FIG. 15A has been calculated in the channel profile calculation unit of the first demodulation branch, a channel profile shown in FIG. 15B has been calculated in that of the second demodulation branch, and a channel profile shown in FIG. 15C has been calculated in that of the third demodulation channel. In addition, in FIGS. 15A, 15B, and 15C, $t_1$ denotes a guard interval during which a power sum is calculated in the first power summation unit $111a$ of the transmission channel decision unit $11a$, and $t_2$ denotes a predetermined time period during which another power sum is calculated in the first power summation unit $116a$ of the transmission channel decision unit $11a'$.

In the cases of FIGS. 15A, 15B, and 15C, the inter-symbol interference decision unit $114a$ of the transmission channel decision unit $11a$ of the first branch determines that inter-symbol interference has occurred, while the inter-symbol interference decision unit $114b$ of the transmission channel decision unit $11b$ of the second branch and the inter-symbol interference decision unit $114c$ of the transmission channel decision unit $11c$ of the third branch determine that no inter-symbol interference has occurred. Then, the transmission channel comparison unit 12 generates first transmission channel distortion comparison information $D_{a1}$, $D_{b1}$, and $D_{c1}$ that are given by the following formulae (21), for example, based upon the determinations of the respective first transmission channel decision units $11a$, $11b$, and $11c$.

$$D_{a1}=d_{isi}=100$$

$$D_{b1}=D_{c1}=d=1 \tag{21}$$

Moreover, in the cases of FIGS. 15A, 15B, and 15C, the transmission channel distortion level decision unit $115a$ of the second transmission channel decision unit $11a'$ of the first branch and the transmission channel distortion level decision unit $115b$ in the second transmission channel decision unit $11b'$ of the second branch output the identical transmission channel distortion information (the second threshold value th2, for example). Furthermore, the transmission channel distortion level decision unit $115c$ of the second transmission channel decision unit $11c'$ of the third branch outputs transmission channel distortion information whose value is smaller than the second threshold value th2 (the first threshold value th1, for example, with the proviso of th2>th1). Then, the transmission channel comparison unit 12 generates second transmission channel distortion comparison information $D_{a2}$, $D_{b2}$, and $D_{c2}$ that are given by the following formulae (22), for example, based upon transmission channel distortion information outputted from the respective second transmission channel decision units $11a'$, $11b'$, and $11c'$.

$$D_{a2}=D_{b2}=d_1$$

$$D_{c2}=d_3$$

$$(d_1 > d_3) \tag{22}$$

The transmission channel comparison unit 12 calculates transmission channel distortion comparison information $D_a$, $D_b$, and $D_c$ as given by the following formulae (23) by multiplying the first transmission channel distortion comparison information by the second transmission channel distortion comparison information. Then, the value of transmission channel distortion comparison information corresponding to a branch in which inter-symbol interference has occurred becomes largest. That is, transmission channel distortion corresponding to the branch in which the inter-symbol interference has occurred is determined to be largest.

$$D_a = D_{a1}D_{a2} = 100d_1$$

$$D_b = D_{b1}D_{b2} = d_1$$

$$D_c = D_{c1}D_{c2} = d_3 \quad (23)$$

As described above, if only the first transmission channel decision unit 11a is used for the cases of FIGS. 15A through 15C, the transmission channel distortion comparison information $D_{b1}$ corresponding to the case of FIG. 15B (the second branch) and the transmission channel distortion comparison information $D_{c1}$ corresponding to the case of FIG. 15C (the third branch) become the identical transmission channel distortion comparison information to each other as given by the formulae (21). Accordingly, if the value of the noise component information corresponding to the second branch and that corresponding to the third branch are the identical value, and the estimated value information corresponding to the second branch and that corresponding to the third branch are the identical value, demodulated signals in the second branch and those in the third branch are combined with the identical combining ratios.

Moreover, if only the second transmission channel decision unit 11a' is used for the cases of FIGS. 15A through 15C, the transmission channel distortion comparison information $D_{a2}$ corresponding to the case of FIG. 15A (the first branch) and the transmission channel distortion comparison information $D_{b2}$ corresponding to the case of FIG. 15B (the second branch) become the identical transmission channel distortion comparison information to each other as given by the formulae (22). Accordingly, if the value of the noise component information corresponding to the first branch and that corresponding to the second branch are the identical value, and the value of the estimated value information corresponding to the first branch and that corresponding to the second branch are the identical value, demodulated signals in the first branch and those in the second branch are combined with the identical combining ratios.

In the case of combining the first transmission channel decision unit 11a with the second transmission channel decision unit 11a', however, the transmission channel distortion comparison information $D_a$ corresponding to the first branch, the transmission channel distortion comparison information $D_b$ corresponding to the second branch, and the transmission channel distortion comparison information $D_c$ corresponding to the third branch, become values different from each other. Accordingly, even if, in each branch, the values of the noise component information are the identical value and those of the estimated value information are also the identical value, demodulated signals in the first branch, those in the second branch, and those in the third branch are combined with combining ratios different from each other.

Namely, in the case of combining the first transmission channel decision unit 11a with the second transmission channel decision unit 11a' as shown FIG. 14, transmission channel distortion can be detected in more detail, which consequently allows combining ratios to be calculated more appropriately depending on transmission channel distortion.

Embodiment 3

In Embodiment 1 and Embodiment 2, the explanation has been made on the cases where the noise power calculation unit 9a is configured such that noise power is calculated based upon the pilot signals. However, the noise power can be calculated not only from the pilot signals but also from demodulated signals corresponding to carriers, except for the pilot signals, modulated by BPSK or DBPSK. For example, a specific carrier out of carriers included in an OFDM signal may in some cases be modulated by BPSK or DBPSK to send out predefined information such as transmission parameters.

A signal for sending the transmission parameters and the like is not a signal given to the diversity receiver. However, the position of the specific carrier is given to the diversity receiver, and the signal is a digitally-modulated binary signal. For this reason, noise component information can be calculated based upon the signal. Note that the noise component information obtained based upon the signal is approximate information.

Figure 16:
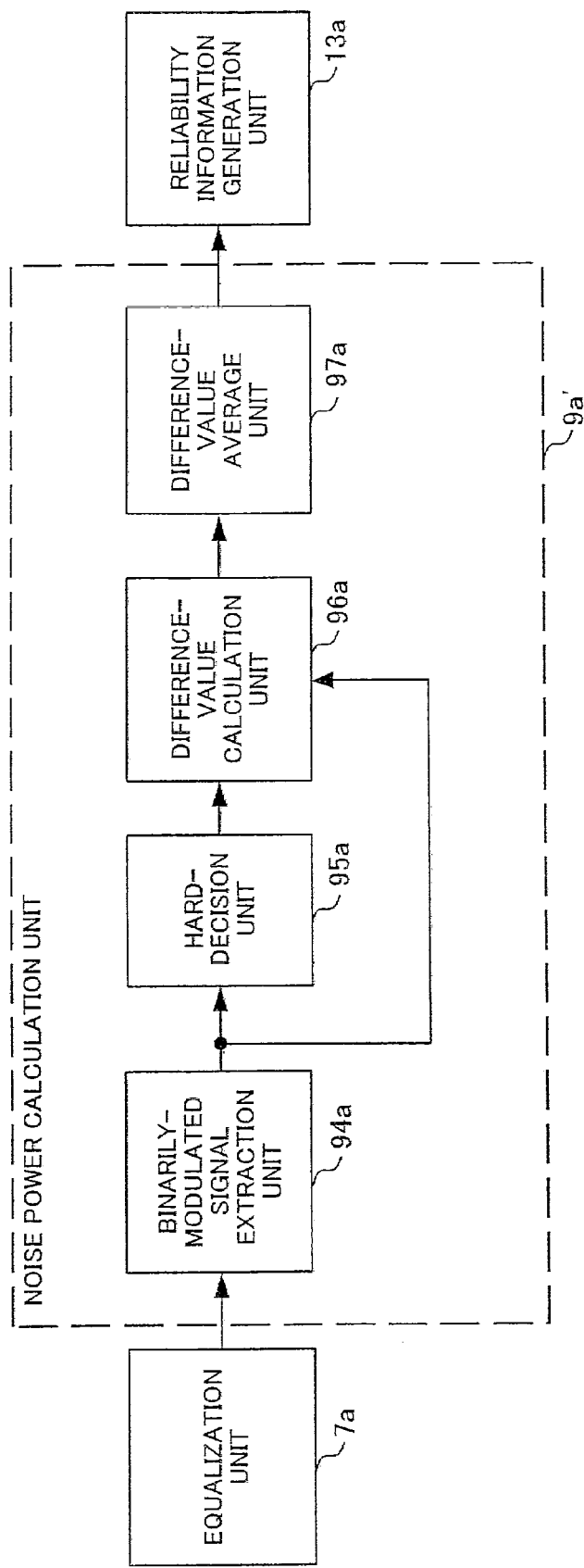
FIG. 16 is a block diagram illustrating a configuration of a noise power calculation unit in Embodiment 3 of the invention.

FIG. 16 is a block diagram illustrating a configuration of a noise power calculation unit 9a' in Embodiment 3. In the following explanations, the same numerals are assigned to the configurations explained in Embodiment 1 and Embodiment 2, and the explanation on the configurations will be omitted.

A binarily-modulated signal extraction unit 94a extracts demodulated signals corresponding to the specific carrier (hereinafter referred to as binarily-demodulated signal), from the demodulated signals outputted from the equalization unit 7a, and outputs them to a hard-decision unit 95a and a difference-value calculation unit 96a.

The hard-decision unit 95a makes a hard-decision with regard to the binarily-demodulated signals, and outputs signals corresponding to the hard-decision result. That is, if the signal points of the binarily-demodulated signals on the constellation have I-components, the decision unit makes the hard-decision with regard to the signal points by determining whether the I-components of the binarily-demodulated signals are positive or negative. For example, in a case where binarily-demodulated signals are expressed as the following formula (24), if the real part of the formula (24) is positive, i.e., the I-component is positive, for example, a result of the hard-decision in the hard-decision unit 95a can be expressed as the following formula (25); on the other hand, if the imaginary part of the formula (24) is negative, a result of the hard-decision in the hard-decision unit 95 can be expressed as the following formula (26), where $C^{bin}$ in the formulae (25) and (26) is the quantity of I-component.

$$y_{a(i,k)}^{bin} = y_{I,a(i,k)}^{bin} + j y_{Q,a(i,k)}^{bin} \quad (24)$$

$$d_{a(i,k)}^{bin} = d_{I,a(i,k)}^{bin} + j d_{Q,a(i,k)}^{bin} = |c^{bin}| + j0 \quad (25)$$

$$d_{a(i,k)}^{bin} = d_{I,a(i,k)}^{bin} + j d_{Q,a(i,k)}^{bin} = -|c^{bin}| + j0 \quad (26)$$

The difference-value calculation unit 96a performs the calculation of the following formula (27) based upon the binarily-modulated signals outputted from the binarily-modulated signal extraction unit 94a and the hard-decision results of the hard-decision unit 95a. That is, the differences between the power of the binarily-modulated signals and the power corresponding to the hard-decision results of the hard-decision unit 95a are calculated (hereinafter referred to as power difference values). Then, the difference-value calculation unit 96*a* outputs to a difference-value average unit 97 signals corresponding to the power difference values.

$$E_{a(i,k)}^{bin} = (y_{I,a(i,k)}^{bin} - d_{I,a(i,k)}^{bin})^2 + (y_{Q,a(i,k)}^{bin})^2 \quad (27)$$

The difference-value average unit 97*a* calculates an average value of the power difference values outputted from the difference-value calculation unit 96*a* during a predetermined time period. Then, the average unit outputs to the first reliability generation unit 13*a* the average value as noise component information. That is, the signal outputted from the difference-value average unit 97*a* is a signal proportional to an approximate value of the averaged noise power.

As described above, according to the noise power calculation unit 9*a'* explained in Embodiment 3, noise component information can be generated based upon, for example, a signal, except for the pilot signals, that sends transmission parameters. Therefore, by applying the noise power calculation unit 9*a'* to the diversity receiver, the demodulated signals can be combined taking into account the influence of noise components, which resultantly improves reception performance of the diversity receiver.

In addition, while the above explanation has been made on the case of using signals binarily-modulated by BPSK or DBPSK, noise component information may be generated using both pilot signals and binarily-modulated signals.

In the case of using both pilot signals and binarily-modulated signals, providing subsequent to the noise power calculation unit a comparing means (not shown), for example, for comparing noise component information generated based upon the pilot signals (hereinafter referred to as first noise component information) with noise component information generated based upon the binarily-modulated signals (hereinafter referred to as second noise component information), accuracy of the first noise component information and the second noise component information can be determined.

The determination of the comparing means can be made in such a manner, for example, that by comparing a given threshold value with the difference between the power value corresponding to the first noise component information and that corresponding to the second noise component information: if the difference is smaller than the threshold value, the means determines to be accurate the generated first noise component information and second noise component information, and if the difference is larger than the threshold value, the means determines them to be inaccurate. Hence, calculating combining ratios for the demodulated signals based upon the determination, diversity combining can be performed depending on the accuracy of the noise component information.

In addition, the noise power calculation unit 9*a'* explained in Embodiment 3 can be used in the diversity receiver explained in Embodiment 1 or Embodiment 2. That is, a diversity receiver can be configured by replacing the noise power calculation unit 9*a* explained in Embodiment 2 with the noise power calculation unit 9*a'* of Embodiment 3.

Moreover, the determination of the accuracy of the noise component information by the comparing means explained above can also be used in the diversity receiver explained in Embodiment 1 or Embodiment 2.

Embodiment 4

In Embodiment 1 through 3, the explanations have been made on the cases of calculating the combining ratios based upon the noise component information, the channel profile, and the estimated value information of each branch. In Embodiment 4, an explanation will be made, hereinafter, on a case of calculating combining ratios based upon the noise component information, information corresponding to the power values of the received signals in each branch, and the estimated value information.

First, the reason for using the information corresponding to the power values of the received signals in each branch is explained. When the power value of a received signal corresponding to one branch is considerably lower than those of received signals corresponding to the other branches, diversity combining using the lower power received signal may sometimes increase error rate of demodulated signals obtained after having been combined.

In a diversity receiver provided with two branches, for example, when one of the branches (hereinafter referred to as the first branch) can obtain a received signal (i.e., receives an OFDM signal) and the other branch (hereinafter referred to as the second branch) cannot obtain a signal, it is necessary not to use the demodulated signals in the second branch for diversity combining but to output the demodulated signals in the first branch as the demodulated signals having been diversity-combined. That is, it is necessary that the combining ratios used in combining the demodulated signals in the first branch with those in the second branch are 1:0.

However, even when the power value of a received signal is considerably low, the automatic gain control unit 3*a* adjusts the received signal to have a predetermined power value. Thereby, if combining ratios are calculated based upon the signal having been adjusted, the combining ratios may not become a combining ratio depending on the power value of the received signal. For example, in the diversity receiver provided with two branches as described above, the combining ratios may sometimes not become 1:0.

For this reason, the diversity receiver of Embodiment 4 uses information corresponding to the power values of the received signals in each branch so as to calculate combining ratios depending on the power values of the received signals.

Figure 17:
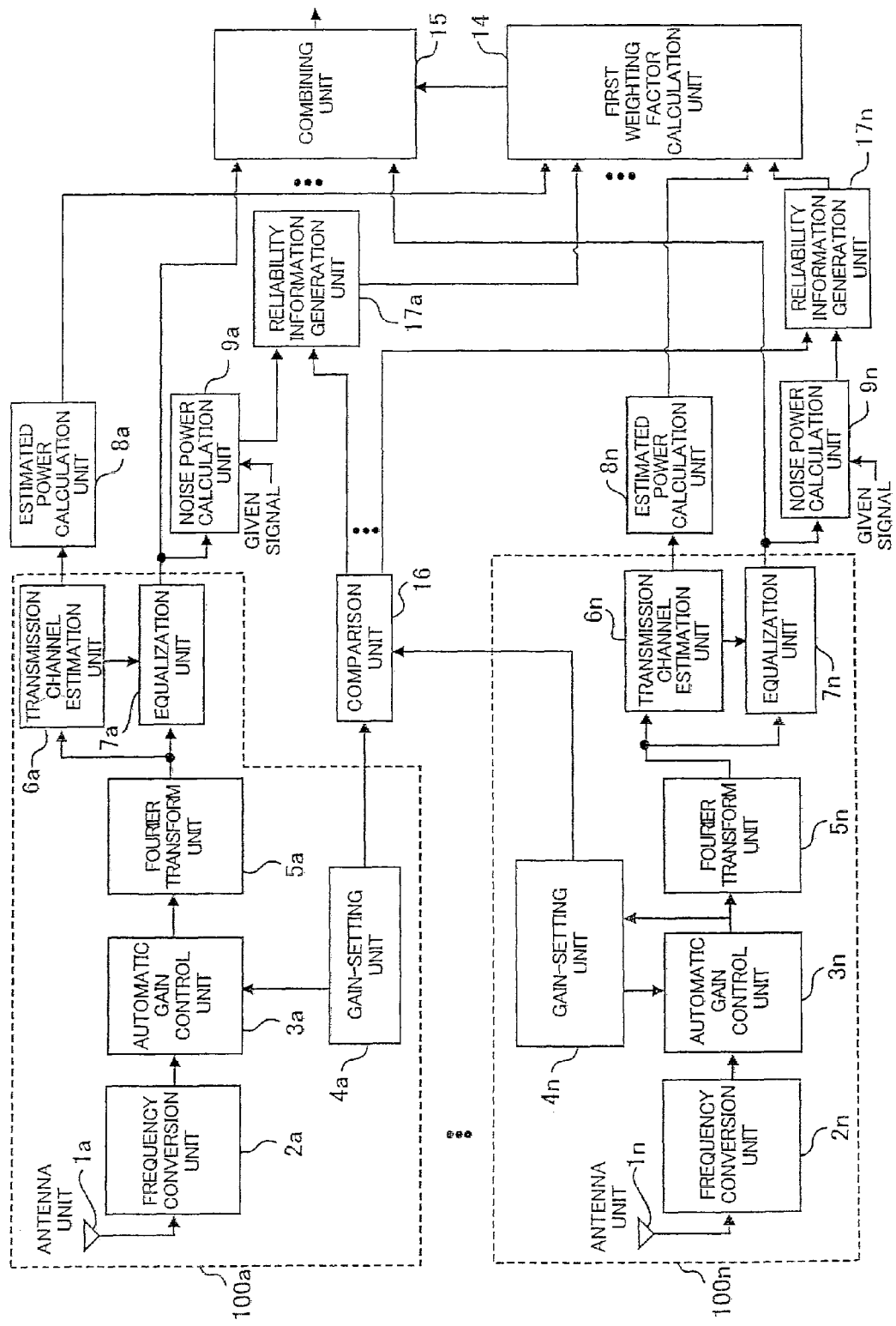
FIG. 17 is a block diagram illustrating a configuration of a diversity receiver in Embodiment 4 of the invention.

FIG. 17 is a block diagram illustrating a configuration of the diversity receiver in Embodiment 4. In the following explanation, the same numerals are assigned to the same configurations as those explained in Embodiment 1 through Embodiment 3, and the explanation on the configurations will be omitted. Moreover, in the following explanation, as for configurations common to the plurality of branches in the diversity receiver, a configuration of only the first branch (the configuration assigned symbol "a") is explained.

Referring to FIG. 17, the gain-setting unit 4*a* outputs to a comparison unit 16 the gain-setting signal. Note that the gain setting signals from the gain-setting units 4*a*, 4*b*, . . . , 4*n* of all the branches in the diversity receiver are inputted to the comparator unit 16.

The comparison unit 16 compares the inputted gain setting signals with each other so as to calculate relative amounts of power value of the gain setting signal corresponding to one of the branches and those of the gain setting signals of all the branches except for the one branch. Then, the comparison unit outputs to the reliability information generation units 17*a*, . . . , 17*n* of the respective branches signals corresponding to information, obtained from the result of the calculation, indicating the relative amounts of power values of the respective gain setting signals (hereinafter referred to as received signal level information). Note that, as described above, the gain setting signal outputted from the gain-setting unit 4*a* is a signal to set the gain of the automatic gain controller 3*a*. That is, the power value of the gain setting signal has a signal level depending on the received signal power value. Accordingly, the power values of the received signals can be compared with each other by comparing the gain setting signals at the comparison unit 16. Note that the signals outputted from the comparison unit 16 are referred to as gain comparison signals in the following explanation.

The generation of the received signal level information in the comparison unit 16 will be specifically explained below. When the diversity receiver is provided with three branches: the first branch, the second branch and the third branch, for example, three gain setting signals are inputted to the comparison unit 16: a gain setting signal (hereinafter referred to as first gain setting signal) outputted from the gain-setting unit 4a of the first branch (hereinafter referred to as first gain setting unit 4a), a gain setting signal (hereinafter referred to as second gain-setting signal) outputted from the gain-setting unit 4b of the second branch (hereinafter referred to as second gain-setting unit 4b), and a gain setting signal (hereinafter referred to as third gain setting signal) outputted from the gain-setting unit 4c of the third branch (hereinafter referred to as third gain-setting unit 4c).

Then, the comparison unit 16 sets a threshold value depending on the maximum power value among the power value of the first gain setting signal (hereinafter referred to as first power value), that of the second gain setting signal (hereinafter referred to as second power value), and that of the third gain setting signal (hereinafter referred to as third power value). The comparison unit 16 also calculates ratios (power ratios) between the maximum power value and the other power values. The following explanation will be made on a case of calculating the power ratios by dividing the maximum power value by the other power values.

Accordingly, if the first power value is maximum, for example, the comparison unit 16 calculates a first power ratio by dividing the first power value by the second power value and a second power ratio by dividing the first power value by the third power value. Then, the comparison unit 16 outputs to the first reliability information generation unit 17a of the first branch a first gain comparison signal. Moreover, the unit compares the first power ratio with the threshold value, and outputs to the second reliability information generation unit 17b of the second branch a signal corresponding to the comparison result (second gain comparison signal). Furthermore, the unit compares the second power ratio with the threshold value, and outputs to the third reliability information generation unit 17c of the third branch a signal corresponding to the comparison result (third gain comparison signal). To be more specific, the unit outputs to the respective reliability information generation units 17a, . . . , 17c gain comparison signals corresponding to received signal level information as given by the following formulae (28).

$$G_a = f_{low}$$
$$G_b = G_c = f \quad (28)$$

Note that, in the formulae (28), $G_a$ denotes received signal level information corresponding to the first gain comparison signal (hereinafter referred to as first received signal level information), $G_b$ denotes that corresponding to the second gain comparison signal (hereinafter referred to as second received signal level information), and $G_c$ denotes that corresponding to the third gain comparison signal (hereinafter referred to as third received signal level information). Moreover, in the formulae (28), f and $f_{low}$ are scalars satisfying the following formula (29), and f is a sufficiently small value compared to $f_{low}$. Specifically, they may be set as f=1 and $f_{low}$=100 or f=1 and $f_{low}$=1000, for example.

$$f_{low} \gg f \quad (29)$$

The reliability information generation units 17a, 17b, 17c of the respective branches generate reliability information indicating reliability of the demodulated signals in the respective branches based upon the received signal level information, corresponding to the respective branches, generated in the gain comparison unit 16, and the noise component information generated in the noise power calculation units 9a, 9b, 9c of the respective branches, and outputs to the first weighting factor calculation unit 14 signals corresponding to the reliability information.

When the diversity receiver is provided with three branches, for example, the reliability information generation unit 17a of the first branch (hereinafter referred to as first reliability information generation unit 17a) generates first reliability information $R_a$ by calculating the following formula (30), and outputs to the first weighting factor calculation unit 14 a signal corresponding to the first reliability information $R_a$.

$$R_a = G_a N_a = f_{low} N_a \quad (30)$$

Moreover, the reliability information generation unit 17b of the second branch (hereinafter referred to as second reliability information generation unit 17b) generates second reliability information $R_b$ by calculating the following formula (31), and outputs to the first weighting factor calculation unit 14 a signal corresponding to the second reliability information $R_b$. Similarly, the reliability information generation unit 17c of the third branch (hereinafter referred to as third reliability information generation unit 17c) generates third reliability information $R_c$ by calculating the following formula (32), and outputs to the first weighting factor calculation unit 14 a signal corresponding to the third reliability information $R_c$.

$$R_b = G_b N_b = f N_b \quad (31)$$

$$R_c = G_c N_c = f N_c \quad (32)$$

In the formulae (30) through (32), $N_a$ denotes the noise component information outputted from the noise power calculation unit 9a of the first branch, $N_b$ denotes that outputted from the noise power calculation unit 9b of the second branch, and $N_c$ denotes that outputted from the noise power calculation unit 9c of the third branch. Note that the smaller are the values corresponding to the reliability information generated in the reliability information generation units 17a, 17b, 17c of the respective branches, the higher is their reliability.

The first weighting factor calculation unit 14, as has been explained in Embodiment 1, calculates weighting factors based upon the reliability information generated in the reliability information generation units 17a, 17b, 17c of the respective branches.

As explained above, according to the diversity receiver in Embodiment 4, combining ratios can be calculated depending on the power values of received signals in each branch. Therefore, even in a case where signal levels are adjusted by the automatic gain control units 3a, . . . , 3n, the combining ratios can be appropriately calculated.

Combining ratios can also be calculated depending on the noise components in the received signals in each branch. That is, the combination of the demodulated signals can be performed carrier by carrier depending on the received signal levels and the noise components in each branch. Consequently, reception performance of the diversity receiver can be improved.

While the above explanation has been made on the case of the diversity receiver provided with three branches, in cases of providing four or more branches, the comparison unit 16 performs the same operation. Moreover, in a case of providing two branches, the comparison unit 16 operates as follows.

Namely, the comparison unit calculates a power ratio by dividing a larger power value by a smaller power value out of the power values of the gain setting signals outputted from each branch so as to compare the power ratio with a predetermined threshold value, and then outputs to each branch gain comparison signals in accordance with the comparison result. Note that the predetermined threshold value may be either a predetermined fixed value or that adaptably set depending on the gain comparison signals outputted from each branch, as the case of providing three branches described above.

While the above explanation has been made on the case where, by setting f and $f_{low}$ as given by formula (29), weighting factors for demodulated signals outputted from a branch in which the power value of the received signal is small, is set so as to be sufficiently small compared to those for demodulated signals outputted from a branch in which the power value of the received signal is large, weighting factors may be adaptably calculated by generating received signal level information depending on the power values of the received signals, i.e., depending on the amounts of power values corresponding to gain setting signals outputted from the respective gain-setting units $4a, \ldots, 4n$. For example, by setting in the comparison unit 16 a plurality of threshold values to be compared to the power ratio, a threshold value that is larger than and closest to the power ratio may be outputted as the received signal level information, to the reliability information generation unit of each branch. Note that, as described above, when the received signal level information is generated depending on the amounts of power values corresponding to the gain setting signals outputted from the respective gain-setting units $4a, \ldots, 4n$, the smaller are the power values corresponding to the gain setting signals outputted from the respective gain-setting units $4a, \ldots, 4n$ (i.e., the larger the power value of the received signal), the smaller are received signal level information values outputted from the comparison unit 16.

Moreover, while the above explanation has been made on the case where the received signal level information is generated by comparing the threshold values with the power ratios, the received signal level information may be generated by comparing the threshold values with power difference values instead of the power ratios. Note that the power difference values can be calculated, for example, by subtracting the other power values from the maximum one.

Furthermore, the transmission channel decision unit 11a' explained in Embodiment 2 can also be used in the diversity receiver in Embodiment 4. Still further, the noise power calculation unit 9a' explained in Embodiment 3 may also be used in the diversity receiver in Embodiment 4.

Embodiment 5

In Embodiment 4, the explanation has been made on the case of calculating the combining ratios based upon the noise component information, the received signal level information, and the estimated value information of each branch. In Embodiment 5, a case will be explained where combining ratios are calculated based upon the received signal level information, the transmission channel distortion information, and the estimated value information of each branch.

As explained in FIG. 7, the power value of the received signal in each branch includes a power value corresponding to desired incoming carriers and that corresponding to undesired incoming carriers. Therefore, to calculate more appropriate combining ratios, it is necessary to take into account the influence of the power value of the undesired incoming carriers, in addition to the received signal power value and the like. Hence, in a diversity receiver in Embodiment 5, combining ratios are calculated carrier by carrier based upon the received signal level information, the transmission channel distortion information, and the estimated value information.

Figure 18:
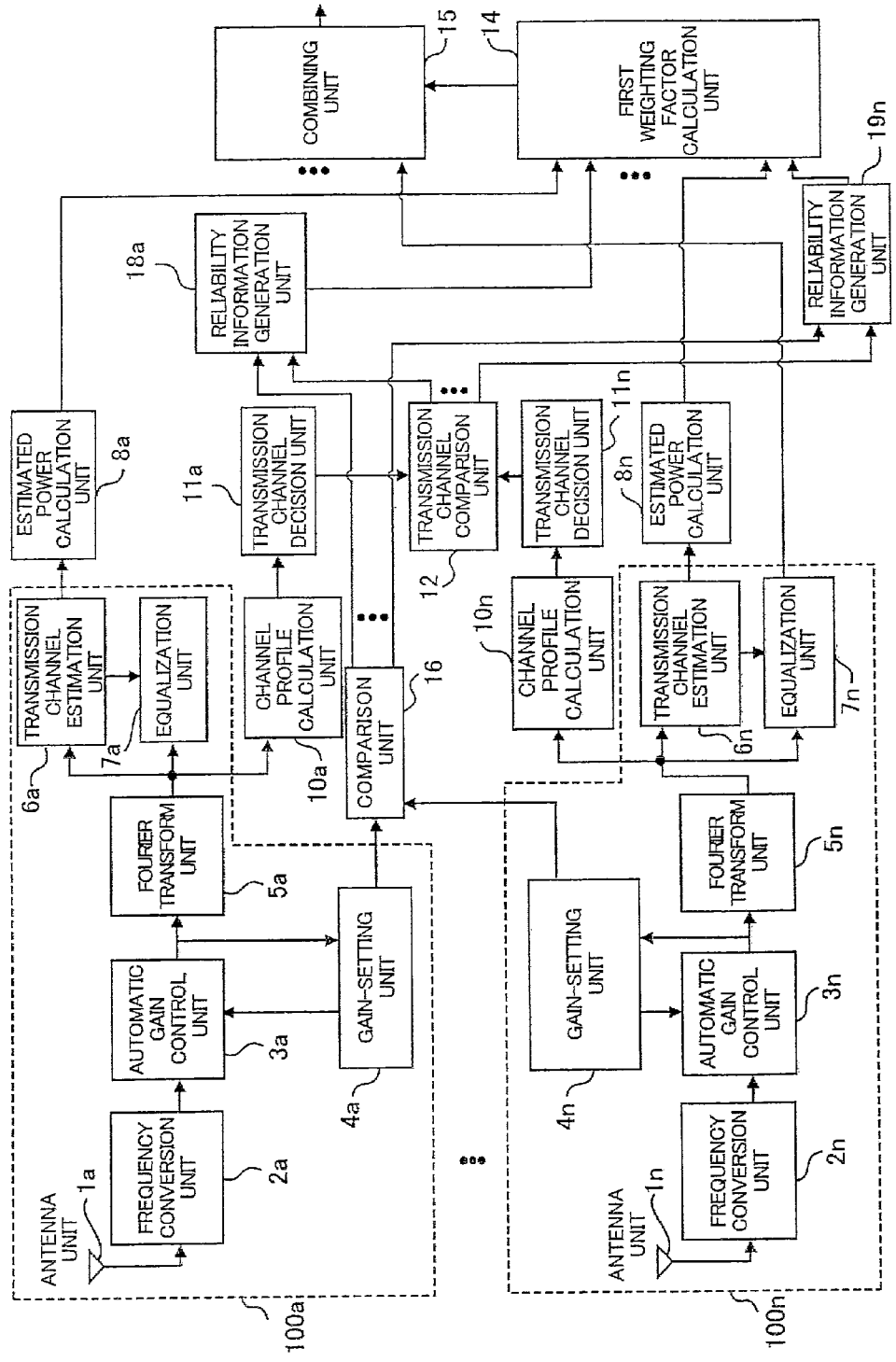
FIG. 18 is a block diagram illustrating a configuration of a diversity receiver in Embodiment 5 of the invention.

FIG. 18 is a block diagram illustrating a configuration of the diversity receiver in Embodiment 5. In the following explanation, the same numerals are assigned to the same configurations as those explained in Embodiment 1 through 4, and the explanation on the configurations will be omitted.

Referring to FIG. 18, the comparison unit 16 outputs to reliability information generation units $18a, \ldots, 18n$ of the respective branches the gain comparison signals corresponding to the received signal level information. Moreover, the transmission channel comparison unit 12 outputs to the reliability information generation units $18a, \ldots, 18n$ of the respective branches the transmission channel distortion information. Then, the reliability information generation units $18a, \ldots, 18n$ of the respective branches generate reliability information based upon the signals corresponding to the received signal level information and those corresponding to the transmission channel distortion information.

When the diversity receiver is provided with three branches: a first branch, a second branch, and a third branch, for example, the first reliability information generation unit 18a of the first branch generates first reliability information $R_a$ based upon the first received signal level information $G_a$, corresponding to the first branch, generated in the comparison unit 16, and the first transmission channel distortion information $D_a$, corresponding to the first branch, generated in the transmission channel comparison unit 12. Specifically, $R_a$ is calculated with the following formula (33).

$$R_a = G_a D_a \qquad (33)$$

Moreover, the second reliability information generation unit 18b of the second branch generates second reliability information $R_b$ by calculation with the following formula (34) based upon the second received signal level information $G_b$, corresponding to the second branch, generated in the comparison unit 16, and the second transmission channel distortion information $D_b$, corresponding to the second branch, generated in the transmission channel comparison unit 12. Similarly, the third reliability information generation unit 18c of the third branch generates third reliability information $R_c$ by calculation with the following formula (35) based upon the third received signal level information $G_c$, corresponding to the third branch, generated in the comparison unit 16, and the third transmission channel distortion information $D_c$, corresponding to the third branch, generated in the transmission channel comparison unit 12.

$$R_b = G_b D_b \qquad (34)$$

$$R_c = G_c D_c \qquad (35)$$

Note that, as has been explained in Embodiment 1 through 4, the received signal level information value becomes small if the received signal power value of each branch is large, and the transmission channel distortion information value becomes small if the transmission channel distortion corresponding to each branch is small. Accordingly, the smaller are the reliability information values by calculation with the formulae (33) through (35), respectively, the higher is demodulated signal reliability of each branch.

As explained above, according to the diversity receiver in Embodiment 5, combining ratios can be calculated depending on the received signal power value of each branch. Therefore, even in a case where power values are adjusted by the automatic gain control units $3a, \ldots, 3n$, combining ratios can be appropriately calculated.

Moreover, the combining ratios can be calculated depending on the transmission channel distortion corresponding to each branch. That is, the combination of the demodulated signals can be performed carrier by carrier depending on the received signal level and the transmission channel distortion of each branch. Consequently, reception performance of the diversity receiver can be improved.

In addition, the transmission channel decision unit $11a'$ explained in Embodiment 2 can also be used in the diversity receiver in Embodiment 5. Moreover, the noise power calculation unit $9a'$ explained in Embodiment 3 may also be used in the diversity receiver in Embodiment 5.

Embodiment 6

In Embodiment 5, the explanation has been made on the case where the combining ratios are calculated carrier by carrier based upon the received signal level information, the transmission channel distortion information, and the estimated value information of each branch. In Embodiment 6, a case is explained where combining ratios are calculated carrier by carrier based upon the received signal level information, the transmission channel distortion comparison information, the noise component information, and the estimated value information of each branch.

Figure 19:
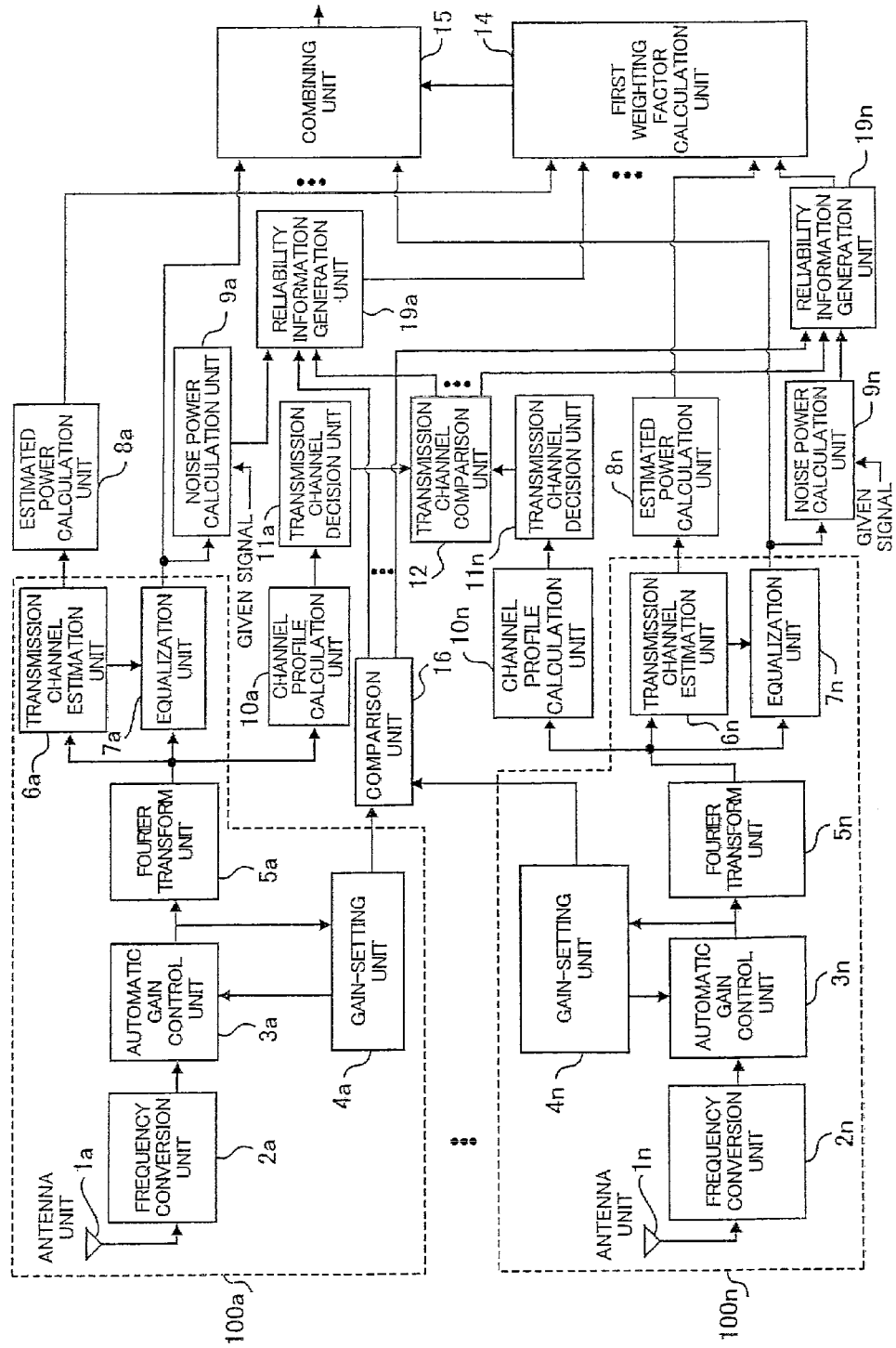
FIG. 19 is a block diagram illustrating a configuration of a diversity receiver in Embodiment 6 of the invention.

FIG. 19 is a block diagram illustrating a configuration of a diversity receiver in Embodiment 6. In the following explanation, the same numerals are assigned to the same configurations as those explained in Embodiment 1 through Embodiment 5, and the explanation on the configurations will be omitted.

Referring to FIG. 19, the comparison unit 16 outputs to reliability information generation units $19a, \ldots, 19n$ of the respective branches the gain comparison signals corresponding to the received signal level information. Moreover, the transmission channel comparison unit 12 outputs to the reliability information generation units $19a, \ldots, 19n$ of the respective branches the signals corresponding to the transmission channel distortion information. Furthermore, the noise power calculation units $9a, \ldots, 9n$ of the respective branches generate noise component information, and output to the reliability information generation units $19a, \ldots, 19n$ of the respective branches the signals in proportion to the noise component information. Then, the reliability information generation units $19a, \ldots, 19n$ of the respective branches generate reliability information based upon the received signal level information, the transmission distortion information, and the noise component information.

When the diversity receiver is provided with three branches: a first branch, a second branch, and a third branch, for example, the first reliability information generation unit $19a$ of the first branch generates first reliability information $R_a$ based upon the first received signal level information $G_a$, corresponding to the first branch, generated in the comparison unit 16, the first transmission channel distortion comparison information $D_a$, corresponding to the first branch, generated in the transmission channel comparison unit 12, and the first noise component information generated in the noise power calculation unit $9a$ of the first branch. Specifically, $R_a$ is calculated with the following formula (36).

$$R_a = G_a D_a N_a \tag{36}$$

Moreover, the second reliability information generation unit $19b$ of the second branch generates second reliability information $R_b$ by calculation with the following formula (37) based upon the second received signal level information $G_b$, corresponding to the second branch, generated in the comparison unit 16, the second transmission channel distortion comparison information $D_b$, corresponding to the second branch, generated in the transmission channel comparison unit 12, and the second noise component information generated in the noise power calculation unit $9b$ of the second branch. Similarly, the third reliability information generation unit $19c$ of the third branch generates third reliability information $R_c$ by calculation with the following formula (38) based upon the third received signal level information $G_c$, corresponding to the third branch, generated in the comparison unit 16, the third transmission channel distortion comparison information $D_c$, corresponding to the third branch, generated in the transmission channel comparison unit 12, and the third noise component information generated in the noise power calculation unit $9c$ of the third branch.

$$R_b = G_b D_b N_b \tag{37}$$

$$R_c = G_c D_c N_c \tag{38}$$

Note that, as has been explained in Embodiment 1 through 5, the received signal level information value becomes small if the received signal power value of each branch is large, and the transmission channel distortion comparison information value becomes small if the transmission channel distortion corresponding to each branch is small. Moreover, the noise component information value becomes small if the noise component is small. Accordingly, the smaller are reliability information values calculated by calculation with the formulae (36) through (38), respectively, the higher demodulated signal reliability of each branch.

As explained above, according to the diversity receiver in Embodiment 6, combining ratios can be calculated depending on the received signal power value of each branch. Therefore, even when the received signal power values are adjusted by the automatic gain control units $3a, \ldots, 3n$, the combining ratios can be appropriately calculated.

Moreover, the combining ratios can be calculated depending on the transmission channel distortion corresponding to each branch. Furthermore, the combining ratios can also be calculated depending on the noise component included in the received signal in each branch. That is, the combination of the demodulated signals can be performed carrier by carrier depending on the received signal level, the transmission channel distortion, and the noise component of each branch. Consequently, reception performance of the diversity receiver can be improved.

In addition, the transmission channel decision unit $11a'$ explained in Embodiment 2 can also be used in the diversity receiver in Embodiment 6. Moreover, the noise power calculation unit $9a'$ explained in Embodiment 3 may also be used in the diversity receiver in Embodiment 6.

Embodiment 7

In Embodiment 1 through 6, the explanation has been made on the case of calculating the weighting factors based upon the estimated value information and the reliability information. In Embodiment 7, an explanation will be made on a diversity receiver that can adaptively switch between maximum-ratio combining diversity and selective combining diversity.

In cases where diversity combining is performed by the diversity receiver provided with a plurality of branches, if the demodulated signal reliability of any one of the branches is high and those of the other branches are remarkably lower than that of the one branch, the error rate of the demodulated signals finally outputted from the diversity receiver may sometimes be small by performing not the maximum-ratio combining diversity but the selective combining diversity by which the demodulated signals in the one branch is selected as the demodulated signals of the diversity receiver. For this reason, in the diversity receiver of Embodiment 7, either the maximum-ratio combining diversity or the selective combining diversity is adaptively selected.

Figure 20:
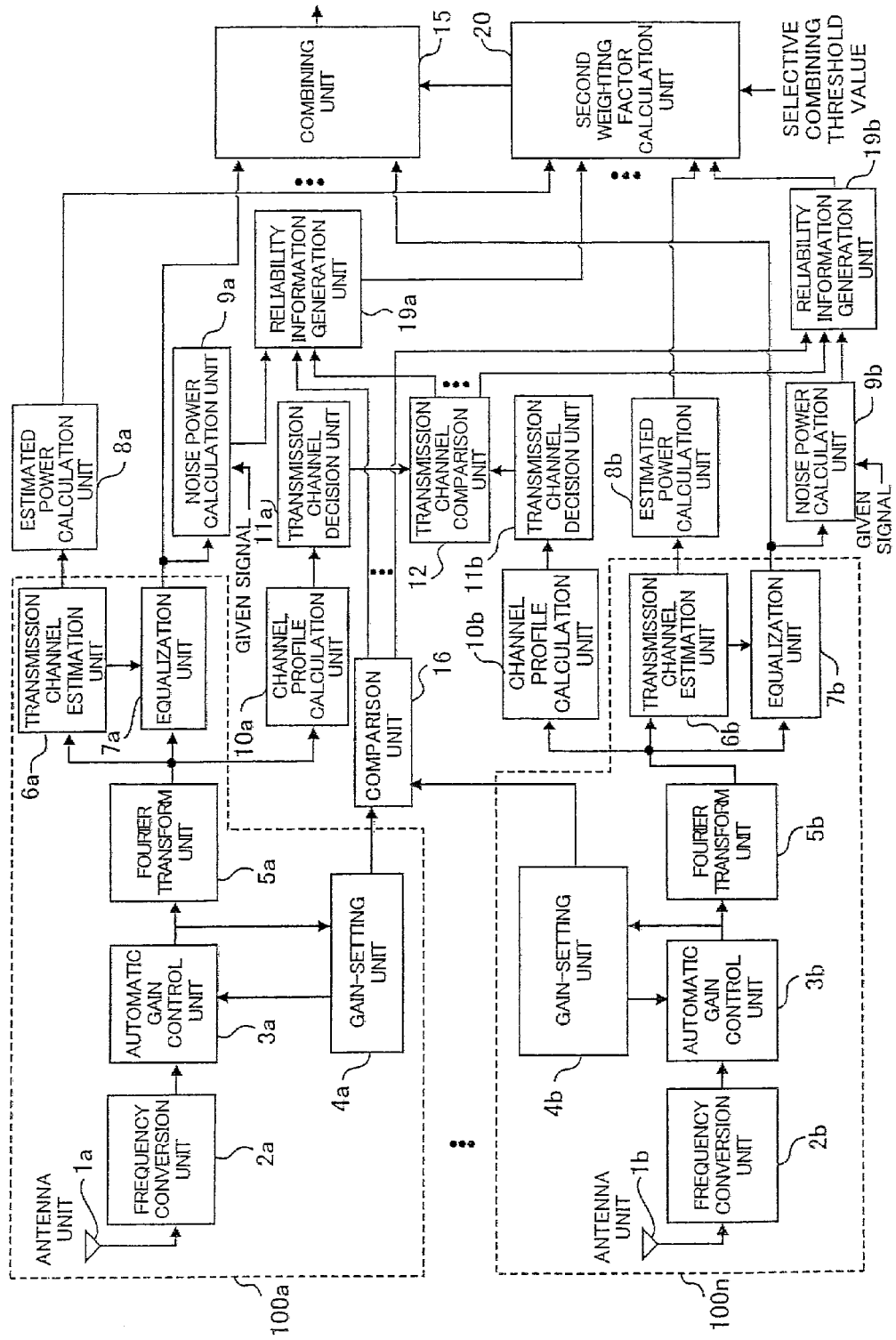
FIG. 20 is a block diagram illustrating a configuration of a diversity receiver in Embodiment 7 of the invention.

FIG. 20 is a block diagram illustrating a configuration of a diversity receiver in Embodiment 7. In FIG. 20, the same numerals are assigned to the same configurations as those explained in Embodiment 1 through 6, and the explanation on the configurations will be omitted. In the following, an explanation is made on a case of the diversity receiver being provided with two branches; one is referred to as the first branch and the other, the second branch.

Referring to FIG. 20, a second weighting factor calculation unit 20 calculates weighting factors based upon the reliability information generated in the reliability information generation units 19a and 19b of the respective branches, the estimated value information generated in the estimated power calculation units 8a and 8b, and a predetermined threshold value (hereinafter referred to as selective combining threshold value). To be more specific, if a ratio or a difference of values calculated based upon the reliability information and the estimated value information for each of the first and the second branch is larger than the selective combining threshold value, weighting factors are calculated so that the selective combining diversity is performed.

On the other hand, if the ratio or the difference is smaller than the selective combining threshold value, weighting factors are calculated so that the maximum-ratio combining diversity is performed as is the case with the first weighting factor calculation unit 14 in Embodiment 1 through 6. It should be noted that, in calculating weighting factors so as to perform the selective combining diversity, weighting factors for demodulated signals of high reliability (i.e., the reliability information value is small) are set as one. Moreover, the selective combining threshold value is arbitrarily determined according to the H/W configuration, the specification, or the design of the diversity receiver.

Figure 21:
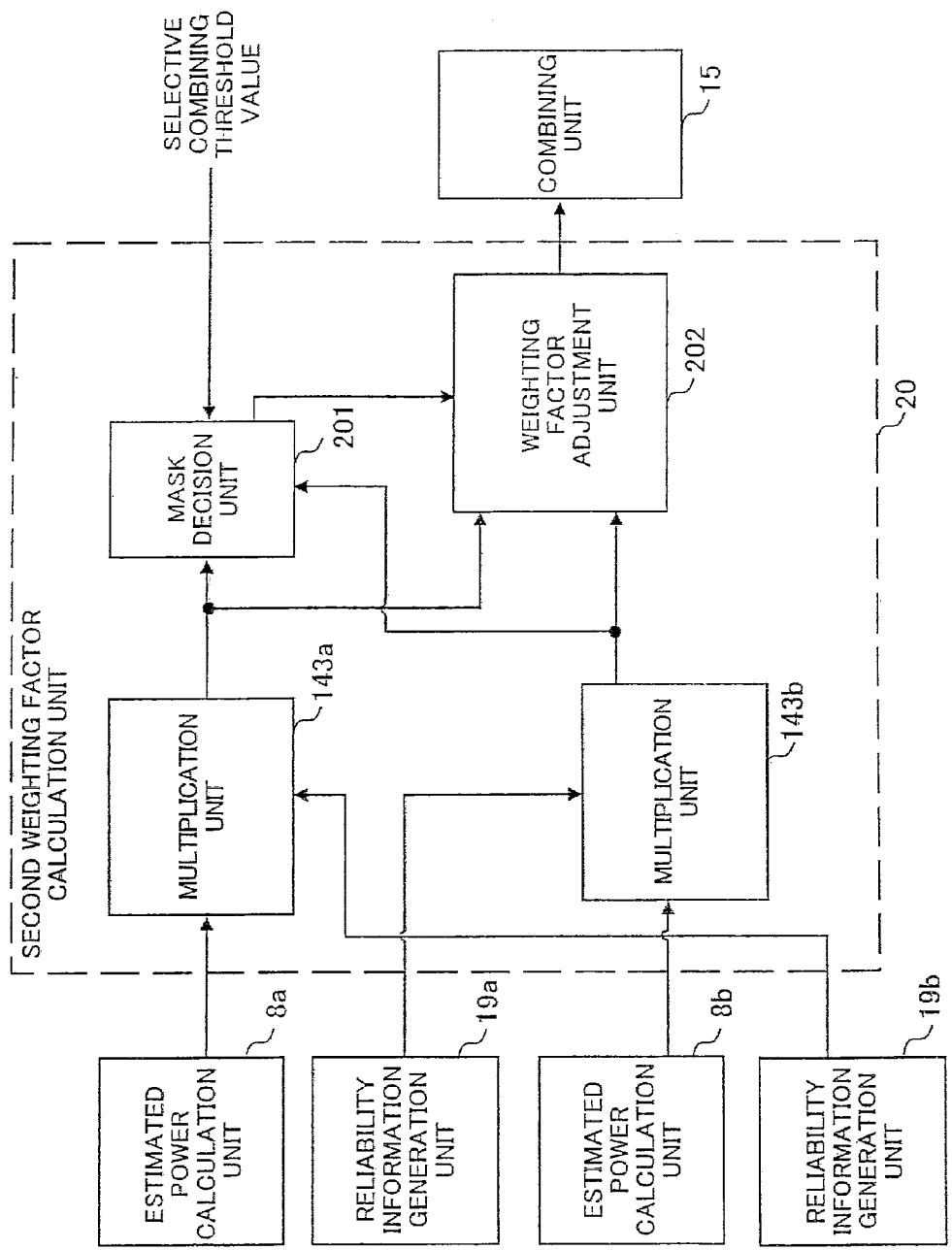
FIG. 21 is a block diagram of a configuration of a weighting factor calculation unit in Embodiment 7 of the invention.

FIG. 21 is a block diagram illustrating a configuration of the second weighting factor calculation unit 20. Referring to FIG. 21, a first multiplication unit 143a outputs to a mask decision unit 201 and to a weighting factor adjustment unit 202 a signal corresponding to the result of the multiplication of the first estimated value information generated in the estimated power calculation unit 8a of the first branch by the second reliability information generated in the reliability information calculation unit 19b of the second branch. Similarly, a second multiplication unit 143b outputs to the mask decision unit 201 and to the weighting factor adjustment unit 202 a signal corresponding to the result of the multiplication of the second estimated value information generated in the estimated power calculation unit 8b of the second branch by the first reliability information generated in the reliability information calculation unit 19a of the first branch.

The mask decision unit 201 compares the multiplication result in the first multiplication unit 143a with that in the second multiplication unit 143b so as to calculate the ratio of the multiplication results. Note that the mask decision unit 201 of Embodiment 7 calculates the ratio by dividing the larger value of the multiplication result by the smaller one.

Moreover, the mask decision unit 201 compares the ratio obtained by the above division result with the selective combining threshold value, and outputs to the weighting factor adjustment unit 202 a signal indicating that weighting factors are set as one for the demodulated signals in the branch corresponding to the estimated value information in which the multiplication result is larger, if the ratio is larger than the selective combining threshold value. That is, outputted to the weighting factor adjustment unit 202 is the signal indicating that the selective combining diversity, which selects the demodulated signals of high reliability, is performed.

If the ratio is larger than the selective combining threshold value and the demodulated signal reliability corresponding to the first branch is high, for example, the multiplication result in the first multiplication unit 143a becomes larger than that in the multiplication unit 143b. This is due to a reliability information value corresponding to demodulated signals of high reliability being small. Accordingly, in the above case, the mask decision unit 201 outputs to the weighting factor adjustment unit 202 a signal to set as one weighting factors for the demodulated signals in the first branch and as zero, those in the second branch.

If the ratio is smaller than the selective combining threshold value, on the contrary, the mask decision unit outputs to the weighting factor adjustment unit 202 a signal indicating that weighing factors are calculated for the demodulated signals in each branch, similarly to the weighting factor calculation units explained in Embodiment 1 through 6. That is, the signal indicating that the maximum-ratio combining diversity is performed is outputted to the weighting factor adjustment unit 202.

The weighting factor adjustment unit 202 calculates weighting factors for the demodulated signals in each branch depending on the signal outputted from the mask decision unit 201. That is, if the mask decision unit 201 outputs a signal indicating that the selective combining diversity is performed, weighting factors are set as one for the demodulated signals in a branch corresponding to the estimated value information whose value, calculated based upon the reliability information and the estimated value information, is large. If the mask decision unit 201 outputs a signal indicating that the maximum-ratio combining diversity is performed, weighting factors are calculated with such formulae as the formula (14) for the demodulated signals in each branch.

The combining unit 15 combines the demodulated signals outputted from each branch based upon the weighting factors calculated in the weighting factor adjustment unit 202.

As has been explained above, according to the diversity receiver in Embodiment 7, demodulated signals can be combined by adaptively switching between the maximum-ratio combining diversity and the selective combining diversity. Therefore, if the demodulated signal reliability of one of branches is high and those of the other branches are remarkably lower than that of the one branch, error rate increase caused by performing the maximum-ratio combining diversity can be prevented. Consequently, reception performance of the diversity receiver can be improved.

In addition, while the above explanation has been made on the case of the configuration in which the first weighting factor calculation unit 14 in the diversity receiver shown in FIG. 19 explained in Embodiment 6 is replaced with the second weighting factor calculation unit 20 as shown in FIG. 20, the first weighting factor calculation unit 14 in the diversity receivers explained in Embodiment 1 through 6 can be replaced with the second weighting factor calculation unit 20.

Moreover, while the above explanation has been made on the case of calculating the ratio of the multiplication results in the mask decision unit 201, the decision unit can also be configured such that by calculating a difference in the multiplication results, a comparison is made between the difference and the selective combining threshold value.

Furthermore, while the explanation has been made on the case of the diversity receiver provided with two branches, when three or more branches are provided, the weighting factor calculation unit 14 shown in FIG. 8 may be configured such that the mask decision unit 201 is provided so as to control in the unit 201 weighting factors. Accordingly, the weighting factor adjustment unit can be configured as follows, for example.

Figure 22:
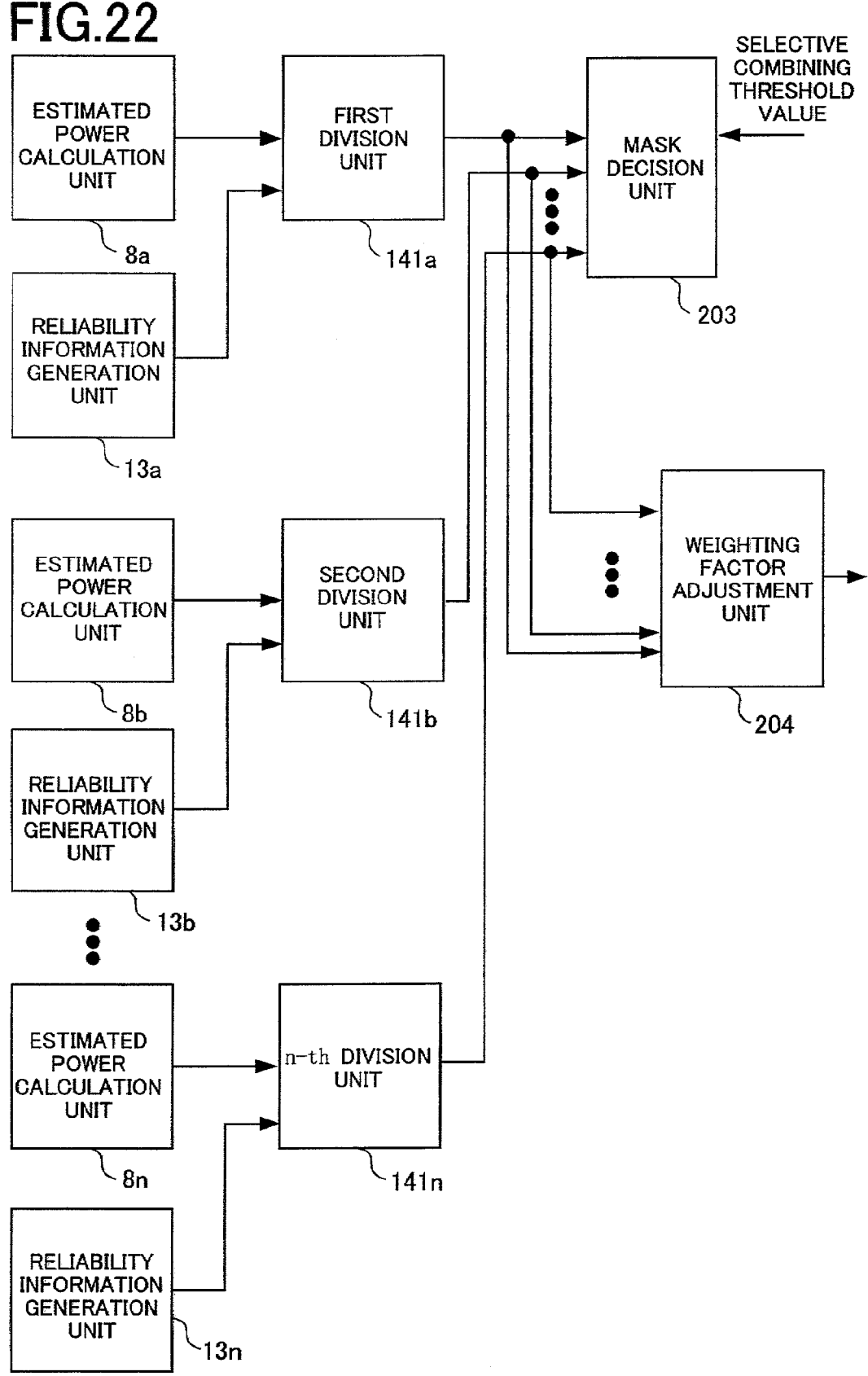
FIG. 22 is a block diagram of another configuration of the weighting factor calculation unit in Embodiment 7 of the invention.

FIG. 22 is a block diagram of another configuration of the weighting factor calculation unit. Referring to FIG. 22, the division units 141a, 141b, . . . , 141n are provided corresponding to the respective branches. That is, the first division unit 141a is provided corresponding to the first branch, the second division unit 141b, the second branch, and the n-th division unit 141n, the n-th branch. Then, division results from the respective division units 141a, 141b, . . . , 141n are inputted to a mask decision unit 203 and a weighting factor adjustment unit 204.

The mask decision unit 203 calculates ratios of the inputted division results so as to compare the ratios with a selective combining threshold value, and outputs to the weighting factor adjustment unit 204 a signal corresponding to the comparison result. The weighting factor adjustment unit 204 calculates weighting factors depending on the inputted signals In addition, the transmission channel decision unit 11a' explained in Embodiment 2 can be used in the diversity receiver in Embodiment 7. Moreover, the noise power calculation unit 9a' explained in Embodiment 3 may also be used in the diversity receiver of Embodiment 7.

Furthermore, while, in Embodiment 1 through 7, the explanation has been made on the cases where power values are used for performing calculations and the like in the diversity receiver, any parameters other than power values, such as current values or voltage values, may be used as long as they indicate signal levels.

INDUSTRIAL APPLICABILITY

The diversity receivers described in Embodiment 1 through 7 can be used in a diversity receiver for terrestrial digital broadcast employing orthogonal frequency division multiplexing scheme. They can also be used in a mobile diversity receiver, such as a personal digital assistant and a car mounted diversity receiver, that receives the terrestrial digital broadcast. Moreover, they may be used in a fixed receiver such as a home use receiver.

The invention claimed is:

1. A demodulator comprising:
 a plurality of demodulating units for demodulating inputted orthogonal frequency division multiplexing signals and for outputting demodulated signals;
 channel profile calculating units each provided for the demodulating units, for calculating channel profiles based upon the demodulated signals outputted from corresponding demodulating units;
 transmission channel decision units for determining, based upon the channel profiles, the amount of transmission channel distortions that each of the demodulated signals has;
 transmission channel comparing units for outputting transmission channel distortion comparison information indicating relative amounts of the transmission channel distortions with respect to each other;
 reliability information generating units for outputting reliability information indicating reliability of the demodulated signals outputted from each of the demodulating units, based upon the transmission channel distortion comparison information;
 a weighting factor calculating unit for outputting, depending on the reliability information, weighting factors used in combining the demodulated signals outputted from each of the demodulating units; and
 a combining unit for combining, in proportion to the outputs of the weighting factor calculating units, the demodulated signals each outputted from the demodulating units.

2. The demodulator of claim 1, wherein each of the channel profile calculating units comprises:
 a pilot signal extracting unit for extracting pilot signals included in one of the inputted orthogonal frequency division multiplexing signals;
 a transmission channel response calculating unit for calculating a transmission channel response corresponding to one of the inputted orthogonal frequency division multiplexing signal, based upon the pilot signals and predetermined given signals;
 a transmission channel interpolating unit for interpolating frequency-wise and time-wise the transmission channel responses;
 an inverse Fourier transforming unit for inverse-Fourier-transforming the transmission channel response interpolated in the transmission channel interpolating unit, and for outputting an incoming carrier signal corresponding to incoming carriers composing one of the inputted orthogonal frequency division multiplexing signals; and
 a unit for calculating one of the channel profiles, based upon the incoming carrier signal.

3. The demodulator of claim 1, wherein each of the transmission channel decision units comprises:
 a first summation calculating unit for calculating as a first sum a summation of signal levels, among the signal levels of signals corresponding to a channel profiles calculated in one of the channel profile calculating units, within a first predetermined time period;
 a second summation calculating unit for calculating as a second sum a summation of signal levels, among the signal levels of the signals corresponding to the channel profiles calculated in the channel profile calculating units, within a second predetermined time period different from the first time period; and
 a decision unit for determining one of the amount of transmission channel distortions, based upon the first sum and the second sum.

4. The demodulator of claim 3, wherein each of the transmission channel decision units further comprises a calculating unit for calculating the ratio or difference of the first sum and the second sum, and the decision unit is configured so as to determine one of the amount of transmission channel distortions by comparing the calculation result with a predetermined threshold value.

5. The demodulator of claim 4, wherein:
 the first summation calculating unit calculates the first sum with a guard interval being the first predetermined time period;
 the second summation calculating unit calculates the second sum with a period within an effective symbol interval and outside the guard interval, being the second predetermined time period; and
 the decision unit is configured to detect inter-symbol interference by comparing the calculation result by the calculating unit with the predetermined threshold value and thereby to determine one of the amount of transmission channel distortions.

6. The demodulator of claim 1 further comprising:
estimated power calculation units each provided for the demodulating units, for calculating estimated power of each of the demodulated signals, wherein the weighting factor calculating unit is configured so as to calculate the weighting factors based upon the estimated power and the reliability information.

7. The demodulator of claim 1, wherein the weighting factor calculating unit is configured so as to set as one a weighting factor for one demodulated signal among the demodulated signals outputted from all the demodulating units, based upon the reliability information corresponding to each of the demodulated signals and a predetermined threshold value.

8. The demodulator of claim 7, wherein the weighting factor calculating unit comprises a mask decision unit for comparing a predetermined value with a value calculated based upon the estimated power and the reliability information, and configured so as to determine according to the comparison result by the mask decision unit a demodulated signal whose weighting factor is set as one, among the demodulated signals.

9. A diversity receiver comprising the demodulator of claim 1.

10. A demodulator comprising:
a plurality of demodulating units for demodulating inputted orthogonal frequency division multiplexing signals and for outputting demodulated signals;
noise component calculating units provided for each of the demodulating units, for outputting noise component information indicating the mount of noise components included in the demodulated signals outputted from corresponding demodulating units;
channel profile calculating units each provided for the demodulating units, for calculating channel profiles based upon the demodulated signals outputted from corresponding demodulating units;
transmission channel decision units for determining, based upon the channel profiles, the amount of transmission channel distortions that each of the demodulated signals has;
transmission channel comparing units for outputting transmission channel distortion comparison information indicating relative amounts of the transmission channel distortions with respect to each other;
reliability information generating units for outputting reliability information indicating reliability of the demodulated signals outputted from each of the demodulating units, based upon the noise component information and the transmission channel distortion comparison information;
a weighting factor calculating unit for outputting, depending on the reliability information, weighting factors used in combining the demodulated signals outputted from each of the demodulating units; and
a combining unit for combining, in proportion to the outputs of the weighting factor calculating units, the demodulated signals each outputted from the demodulating units.

11. The demodulator of claim 10, wherein each of the noise component calculating units comprises:
a pilot signal extracting unit for extracting pilot signals from each of the demodulated signals outputted from the demodulating units;
a signal error calculation unit for calculating a plurality of differences between signal levels of the pilot signals and those of predetermined given signals; and
an average error calculation unit for averaging the plurality of differences calculated during a predetermined time period in the signal error calculation unit, and for outputting the average result as the noise component information.

12. The demodulator of claim 10, wherein each of the noise component calculating units comprises:
a binary signal extracting unit for extracting binarily-modulated signals that have been binarily-modulated, included in the demodulated signals outputted from each of the demodulating units;
a hard-decision unit for making hard-decisions with regard to the binarily-modulated signals;
a difference calculating unit for calculating a plurality of differences between signal levels of the binarily-modulated signals and those of signals corresponding to the results of the hard-decisions made in the hard-decision unit; and
a difference value averaging unit for averaging the plurality of differences calculated in the difference calculating unit during a predetermined time period, and for outputting the average result as the noise component information.

13. A demodulator comprising:
a plurality of demodulating units configured with gain setting units for outputting gain setting signals that set gains in adjusting signal levels of inputted orthogonal frequency division multiplexing signals to predetermined signal levels, the plurality of demodulating units for demodulating inputted orthogonal frequency division multiplexing signals whose levels have been adjusted to the predetermined signal levels, and outputting the demodulated signals;
noise component calculating units provided for each of the demodulating units, for outputting noise component information indicating the amount of noise components included in the demodulated signals outputted from corresponding demodulating units;
comparing units for comparing the gain setting signals outputted from the gain setting units in each of the demodulating units, and outputting reception signal level information indicating relative amounts of the gain setting signals with respect to each other;
reliability information generating units for outputting reliability information indicating reliability of the demodulated signals outputted from each of the demodulating units, based upon the reception signal level information and the noise component information;
a weighting factor calculating unit for outputting, depending on the reliability information, weighting factors used in combining the demodulated signals outputted from each of the demodulating units; and
a combining unit for combining, in proportion to the outputs of the weighting factor calculating units, the demodulated signals each outputted from the demodulating units.

14. A demodulator comprising:
a plurality of demodulating units configured with gain setting units for outputting gain setting signals that set gains in adjusting signal levels of inputted orthogonal frequency division multiplexing signals to predetermined signal levels, the plurality of demodulating units for demodulating inputted orthogonal frequency division multiplexing signals whose levels have been adjusted to the predetermined signal levels, and outputting the demodulated signals;

comparing units for comparing the gain setting signals outputted from the gain setting units in each of the demodulating units, and outputting reception signal level information indicating relative amounts of the gain setting signals with respect to each other;

channel profile calculating units each provided for the demodulating units, for calculating channel profiles based upon the demodulated signals outputted from corresponding demodulating units;

transmission channel decision units for determining, based upon the channel profiles, the amount of transmission channel distortions that each of the demodulated signals has;

transmission channel comparing units for outputting transmission channel distortion comparison information indicating relative amounts of the transmission channel distortions with respect to each other;

reliability information generating units for outputting reliability information indicating reliability of the demodulated signals outputted from each of the demodulating units, based upon the reception signal level information and the transmission channel distortion comparison information;

a weighting factor calculating unit for outputting, depending on the reliability information, weighting factors used in combining the demodulated signals outputted from each of the demodulating units; and a combining unit for combining, in proportion to the outputs of the weighting factor calculating units, the demodulated signals each outputted from the demodulating units.

15. A demodulator comprising:

a plurality of demodulating units configured with gain setting units for outputting gain setting signals that set gains in adjusting signal levels of inputted orthogonal frequency division multiplexing signals to predetermined signal levels, the plurality of demodulating units for demodulating inputted orthogonal frequency division multiplexing signals whose levels have been adjusted to the predetermined signal levels, and outputting the demodulated signals;

comparing units for comparing the gain setting signals outputted from the gain setting units in each of the demodulating units, and outputting reception signal level information indicating relative amounts of the gain setting signals with respect to each other;

noise component calculating units provided for each of the demodulating units, for outputting noise component information indicating the mount of noise components included in the demodulated signals outputted from corresponding demodulating units;

channel profile calculating units each provided for the demodulating units, for calculating channel profiles based upon the demodulated signals outputted from corresponding demodulating units;

transmission channel decision units for determining, based upon the channel profiles, the amount of transmission channel distortions that each of the demodulated signals has;

transmission channel comparing units for outputting transmission channel distortion comparison information indicating relative amounts of the transmission channel distortions with respect to each other;

reliability information generating units for outputting reliability information indicating reliability of the demodulated signals outputted from each of the demodulating units, based upon the reception signal level information and the transmission channel distortion comparison information;

a weighting factor calculating unit for outputting, depending on the reliability information, weighting factors used in combining the demodulated signals outputted from each of the demodulating units; and a combining unit for combining, in proportion to the outputs of the weighting factor calculating units, the demodulated signals each outputted from the demodulating units.

16. A method of demodulation comprising:

a demodulating process of demodulating inputted orthogonal frequency division multiplexing signals and outputting a plurality of demodulated signals;

a noise component calculating process of calculating noise component information indicating the amount of noise components included in each of the demodulated signals;

a channel profile calculating process of calculating channel profiles, based upon each of the demodulated signals;

a transmission channel decision process of determining based upon the channel profiles the amount of transmission channel distortions each corresponding to the demodulated signals;

a transmission channel comparing process of generating transmission channel distortion comparison information indicating relative amounts of the transmission channel distortions with respect to each other;

a reliability information generating process of generating reliability information indicating reliability of each of the demodulated signals, based upon the noise component information and the transmission channel distortion comparison information;

a weighting factor calculating process of calculating, depending on the reliability information, weighting factors used in combining the plurality of demodulated signals; and a combining process of combining, in proportion to the weighting factors, the plurality of demodulated signals.

17. The method of demodulation of claim 16, wherein in the weighting factor calculating process, a weighting factor for one demodulated signal among the plurality of demodulated signals is set as one, based upon the reliability information, corresponding to each of the demodulated signals, generated in the reliability information generating process and upon a predetermined threshold value.

18. A method of demodulation comprising:

a gain setting process of setting gains in adjusting signal levels of inputted orthogonal frequency division multiplexing signals to predetermined signal levels;

a demodulating process of demodulating the inputted orthogonal frequency division multiplexing signals whose signal levels have been adjusted to the predetermined signal levels, and outputting a plurality of demodulated signals;

a noise component calculating process of calculating noise component information indicating the amount of noise components included in each of the demodulated signals;

a channel profile calculating process of calculating channel profiles, based upon each of the demodulated signals;

a transmission channel decision process of determining based upon the channel profiles the amount of transmission channel distortions each corresponding to the demodulated signals;

a transmission channel comparing process of generating transmission channel distortion comparison information indicating relative amounts of the transmission channel distortions with respect to each other;

a reliability information generating process of generating reliability information indicating reliability of each of the demodulated signals, based upon the reception signal level information and the transmission channel distortion comparison information;

a weighting factor calculating process of calculating, depending on the reliability information, weighting factors used in combining the plurality of demodulated signals; and a combining process of combining, in proportion to the weighting factors, the plurality of demodulated signals.

19. A method of demodulation comprising:

a gain setting process of setting gains in adjusting signal levels of inputted orthogonal frequency division multiplexing signals to predetermined signal levels;

a demodulating process of demodulating the inputted orthogonal frequency division multiplexing signals whose signal levels have been adjusted to the predetermined signal levels, and outputting a plurality of demodulated signals;

a noise component calculating process of calculating noise component information indicating the amount of noise components included in each of the demodulated signals;

a comparing process for comparing the gains each corresponding to the demodulated signals, and generating reception signal level information indicating relative amounts of the gain setting signals with respect to each other;

a reliability information generating process of generating reliability information indicating reliability of each of the demodulated signals, based upon the reception signal level information and the noise component information;

a weighting factor calculating process of calculating, depending on the reliability information, weighting factors used in combining the plurality of demodulated signals; and a combining process of combining, in proportion to the weighting factors, the plurality of demodulated signals.

20. A method of demodulation comprising:

a gain setting process of setting gains in adjusting signal levels of inputted orthogonal frequency division multiplexing signals to predetermined signal levels;

a demodulating process of demodulating the inputted orthogonal frequency division multiplexing signals whose signal levels have been adjusted to the predetermined signal levels, and outputting a plurality of demodulated signals;

a comparing process for comparing the gains each corresponding to the demodulated signals, and generating reception signal level information indicating relative amounts of the gain setting signals with respect to each other;

a noise component calculating process of calculating noise component information indicating the amount of noise components included in each of the demodulated signals;

a channel profile calculating process of calculating channel profiles, based upon each of the demodulated signals;

a transmission channel decision process of determining based upon the channel profiles the amount of transmission channel distortions each corresponding to the demodulated signals;

a transmission channel comparing process of generating transmission channel distortion comparison information indicating relative amounts of the transmission channel distortions with respect to each other;

a reliability information generating process of generating reliability information indicating reliability of each of the demodulated signals, based upon the reception signal level information, the transmission channel distortion comparison information, and the noise component information;

a weighting factor calculating process of calculating, depending on the reliability information, weighting factors used in combining the plurality of demodulated signals; and a combining process of combining, in proportion to the weighting factors, the plurality of demodulated signals.

21. A method of demodulation comprising:

a demodulating process of demodulating inputted orthogonal frequency division multiplexing signals and outputting a plurality of demodulated signals;

a channel profile calculating process of calculating channel profiles, based upon each of the demodulated signals;

a transmission channel decision process of determining based upon the channel profiles the amount of transmission channel distortions each corresponding to the demodulated signals;

a transmission channel comparing process of generating transmission channel distortion comparison information indicating relative amounts of the transmission channel distortions comparison information with respect to each other;

a reliability information generating process of generating reliability information indicating reliability of each of the demodulated signals, based upon the transmission channel distortion comparison information;

a weighting factor calculating process of calculating, depending on the reliability information, weighting factors used in combining the plurality of demodulated signals; and a combining process of combining, in proportion to the weighting factors, the plurality of demodulated signals.

* * * * *